US010933435B2

United States Patent
Pringle-Iv

(10) Patent No.: US 10,933,435 B2
(45) Date of Patent: Mar. 2, 2021

(54) APPARATUSES FOR DEPOSITING AN EXTRUDABLE SUBSTANCE ONTO A SURFACE

(71) Applicant: The Boeing Company, Chicago, IL (US)

(72) Inventor: John W. Pringle-Iv, Gardena, CA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 15/849,748

(22) Filed: Dec. 21, 2017

(65) Prior Publication Data

US 2019/0193105 A1    Jun. 27, 2019

(51) Int. Cl.
| | | |
|---|---|---|
| *B05C 5/02* | (2006.01) | |
| *B05C 11/10* | (2006.01) | |
| *B05B 13/04* | (2006.01) | |
| *B25J 11/00* | (2006.01) | |

(52) U.S. Cl.
CPC ........ *B05C 5/0225* (2013.01); *B05B 13/0421* (2013.01); *B05C 5/0216* (2013.01); *B05C 5/0295* (2013.01); *B05C 11/1013* (2013.01); *B05C 11/1015* (2013.01); *B05C 11/1026* (2013.01); *B25J 11/0075* (2013.01)

(58) Field of Classification Search
CPC ... B05C 5/0216; B05C 5/0225; B05C 5/0295; B05C 11/1013; B05C 11/1015; B05C 11/1026; B25J 11/0075; B05B 13/0421
See application file for complete search history.

(56) References Cited

U.S. PATENT DOCUMENTS

| | | | | |
|---|---|---|---|---|
| 4,753,375 A | * | 6/1988 | Takei ................ | B05C 5/0225 222/447 |
| 2002/0071772 A1 | * | 6/2002 | Isogai ............... | F04C 11/005 417/292 |

(Continued)

FOREIGN PATENT DOCUMENTS

| | | |
|---|---|---|
| DE | 298 12 213 | 10/1998 |
| DE | 20 2013005169 | 10/2013 |
| EP | 1 941 823 | 7/2008 |
| EP | 3 257 419 | 12/2017 |
| WO | WO 2017/106900 | 6/2017 |

OTHER PUBLICATIONS

European Patent Office: European Search Report, App. No. 18212960.1 (dated Jul. 9, 2019).

(Continued)

*Primary Examiner* — Dah-Wei D. Yuan
*Assistant Examiner* — Stephen A Kitt
(74) *Attorney, Agent, or Firm* — Walters & Wasylyna LLC

(57) ABSTRACT

An apparatus for depositing an extrudable substance onto a surface. The apparatus comprises a bracket, comprising an opening that has a central axis, and a tubular sleeve, coupled to the bracket via the opening and rotatable relative to the bracket about the central axis. The apparatus further comprises a valve assembly, comprising a valve body, fixed to the tubular sleeve and rotatable relative to the bracket together with the tubular sleeve, and a valve, internal to the valve body. The apparatus also comprises a linear actuator, configured to position the valve relative to the valve body. The apparatus further comprises a nozzle, fixed to the valve body and rotatable relative to the bracket together with the valve body.

20 Claims, 19 Drawing Sheets

(56) References Cited

U.S. PATENT DOCUMENTS

| | | | |
|---|---|---|---|
| 2006/0157517 A1* | 7/2006 | Fiske | B05C 5/001 222/504 |
| 2007/0226926 A1 | 10/2007 | Hiraoka | |
| 2011/0289717 A1 | 12/2011 | Dhanvanthari | |
| 2015/0028051 A1* | 1/2015 | Topf | B05C 11/1013 222/1 |
| 2016/0361734 A1* | 12/2016 | Routen | B05C 11/1013 |
| 2017/0105516 A1 | 4/2017 | Pringle-Iv et al. | |
| 2017/0106401 A1 | 4/2017 | Pringle-Iv et al. | |
| 2017/0106402 A1 | 4/2017 | Pringle-Iv et al. | |
| 2018/0271484 A1 | 9/2018 | Whisler | |
| 2018/0272372 A1 | 9/2018 | Pringle, IV et al. | |
| 2018/0272373 A1 | 9/2018 | Pringle, IV et al. | |

OTHER PUBLICATIONS

European Patent Office, "Extended European Search Report," App. No. 18213396.7 (dated May 22, 2019).

European Patent Office, "Extended European Search Report," App. No. 18213381.9 (dated May 22, 2019).

European Patent Office, "Extended European Search Report," App. No. 18210149.3 (dated May 22, 2019).

European Patent Office, "Extended European Search Report," App. No. 18213401.5 (dated May 22, 2019).

European Patent Office, "Communication pursuant to Article 94(3) EPC," App. No. 18 212 960.1 (dated Aug. 19, 2019).

* cited by examiner (CONTINUED TO FIG.1B)

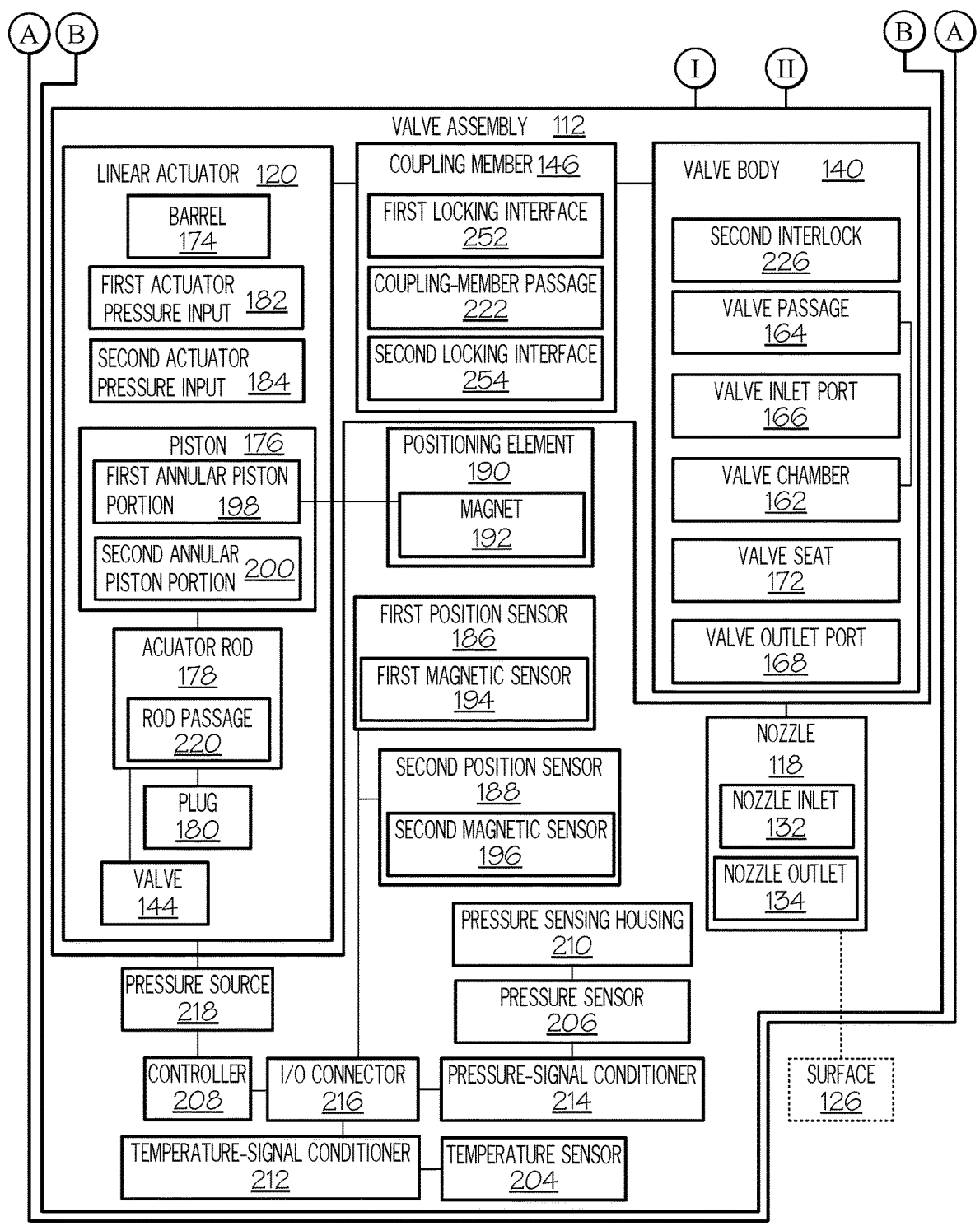
FIG. 1B
(CONTINUED FROM FIG.1A)

APPARATUSES FOR DEPOSITING AN EXTRUDABLE SUBSTANCE ONTO A SURFACE

TECHNICAL FIELD

The present disclosure relates to apparatuses and methods for depositing an extrudable substance onto a surface.

BACKGROUND

During assembly of a structure, such as an aircraft or a component thereof, an extrudable substance must often be deposited onto a surface of the structure. It is desirable to fully automate such deposition of the extrudable substance to reduce cost and manufacturing lead time. However, space constraints, in many instances imposed by the geometry of the structure, make automating the deposition of extrudable substances difficult. For example, a robot may need to deposit the extrudable substance onto a surface, located in a confined space within the structure, such as inside an airplane wing box that, at the tip, is only several inches high. Automated deposition of extrudable substances is further complicated by the fact that the robot must often enter the confined space through a small access port and must navigate around obstacles while manipulating an end effector to deposit the extrudable substance onto desired locations along the surface of the structure.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an apparatus for depositing an extrudable substance onto a surface. The apparatus comprises a bracket, comprising an opening that has a central axis. The apparatus also comprises a tubular sleeve, coupled to the bracket via the opening and rotatable relative to the bracket about the central axis. The apparatus further comprises a valve assembly, comprising a valve body, fixed to the tubular sleeve and rotatable relative to the bracket together with the tubular sleeve, and a valve, internal to the valve body. The valve assembly additionally comprises a linear actuator, configured to position the valve relative to the valve body. The apparatus also comprises a nozzle, fixed to the valve body and rotatable relative to the bracket together with the valve body.

The apparatus provides for depositing the extrudable substance, though the nozzle, to the surface of a workpiece, for example, located in a confined space. The configuration of the tubular sleeve and the valve assembly of the apparatus substantially reduces the size of the apparatus. Rotation of the tubular sleeve enables controlling angular orientation of the nozzle relative to the bracket and the surface during deposition of the extrudable substance onto the surface at selective locations.

Another example of the subject matter according to the invention relates to a system for depositing an extrudable substance onto a surface. The system comprises a cartridge, configured to contain the extrudable substance. The system also comprises a flow-bypass assembly, communicatively coupled with the cartridge and configured to selectively purge air from the extrudable substance. The system further comprises a delivery tube, comprising a first delivery-tube end, communicatively coupled with the flow-bypass assembly, and a second delivery-tube end, in communication with the first delivery-tube end. The system additionally comprises a valve assembly, communicatively coupled with the second delivery-tube end, and a nozzle, communicatively coupled with the valve assembly.

The system provides for depositing the extrudable substance, though the nozzle, to the surface of a workpiece. The flow-bypass assembly enables selective control of flow of the extrudable substance to the delivery tube. The flow-bypass assembly further enables purging of air from the extrudable substance prior to the extrudable substance entering the delivery tube. Purging air prior to entry into the delivery tube eliminates wasting a portion of the extrudable substance resulting from passing air through the delivery tube and out off the valve assembly, for example, during replacement of the cartridge and/or a purging operation.

Another example of the subject matter according to the invention relates to a method of depositing an extrudable substance onto a surface. The method comprises (1) delivering the extrudable substance from a cartridge to a flow-bypass assembly, (2) selectively controlling the flow-bypass assembly to purge air from the extrudable substance before the extrudable substance enters a delivery tube, (3) selectively controlling the flow-bypass assembly to deliver the extrudable substance from the flow-bypass assembly to a valve assembly via the delivery tube, and (4) controlling flow of the extrudable substance from the valve assembly to a nozzle.

The method provides for depositing the extrudable substance, from the cartridge, through the nozzle, onto the surface of a workpiece, for example, located in confined space. Purging air from the extrudable substance using the flow-bypass assembly before delivering the extrudable substance to the delivery tube prevents air from becoming entrapped within the delivery tube. Preventing air from becoming entrapped within the delivery tube eliminates wasting a portion of the extrudable substance that is located within the delivery tube resulting from passing air from the cartridge through the delivery tube and out off the valve assembly, which would otherwise be required to purge air entrapped within the delivery tube, for example, during replacement of the cartridge and/or a purging operation.

BRIEF DESCRIPTION OF THE DRAWINGS

Figure 1A:
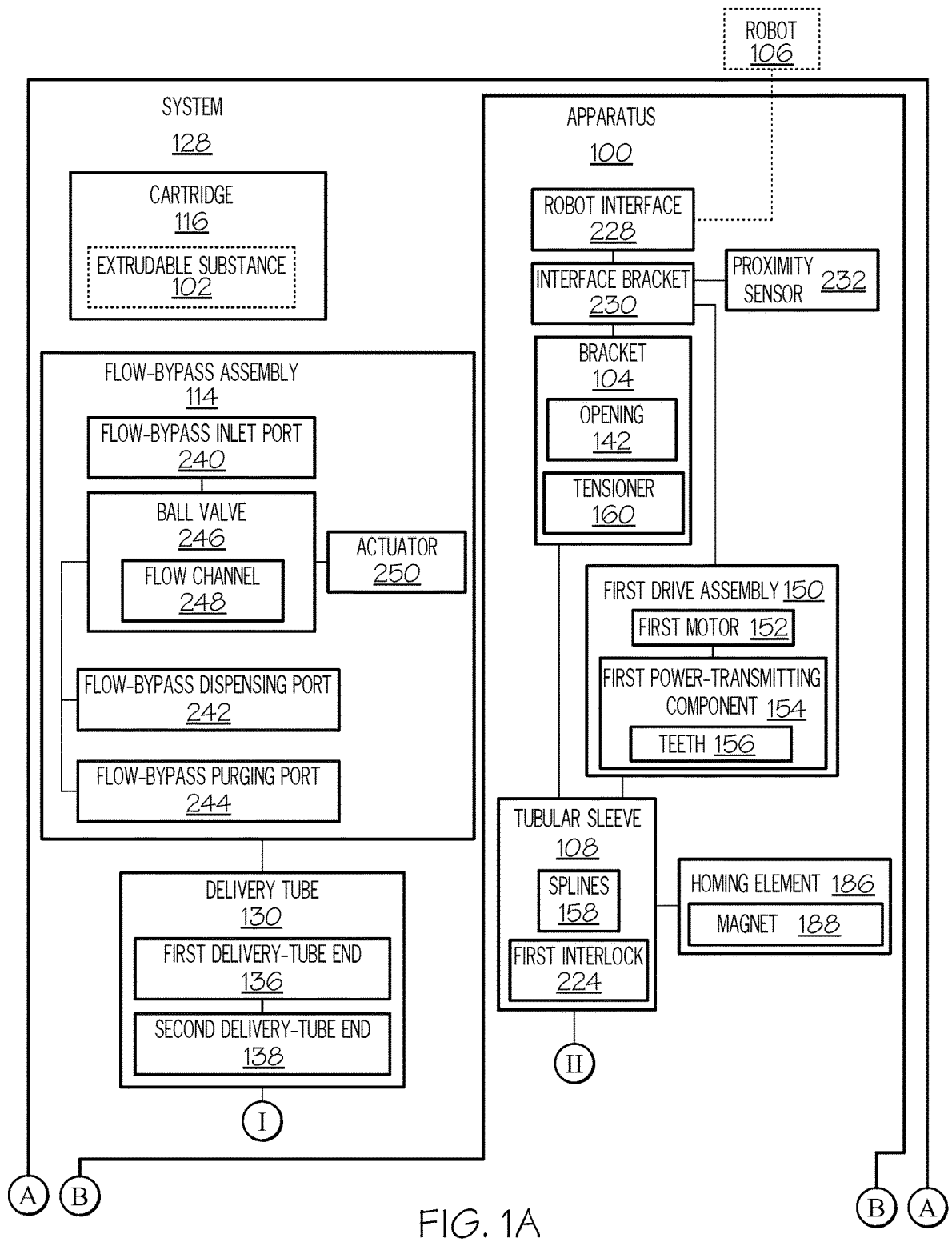
Figure 2:
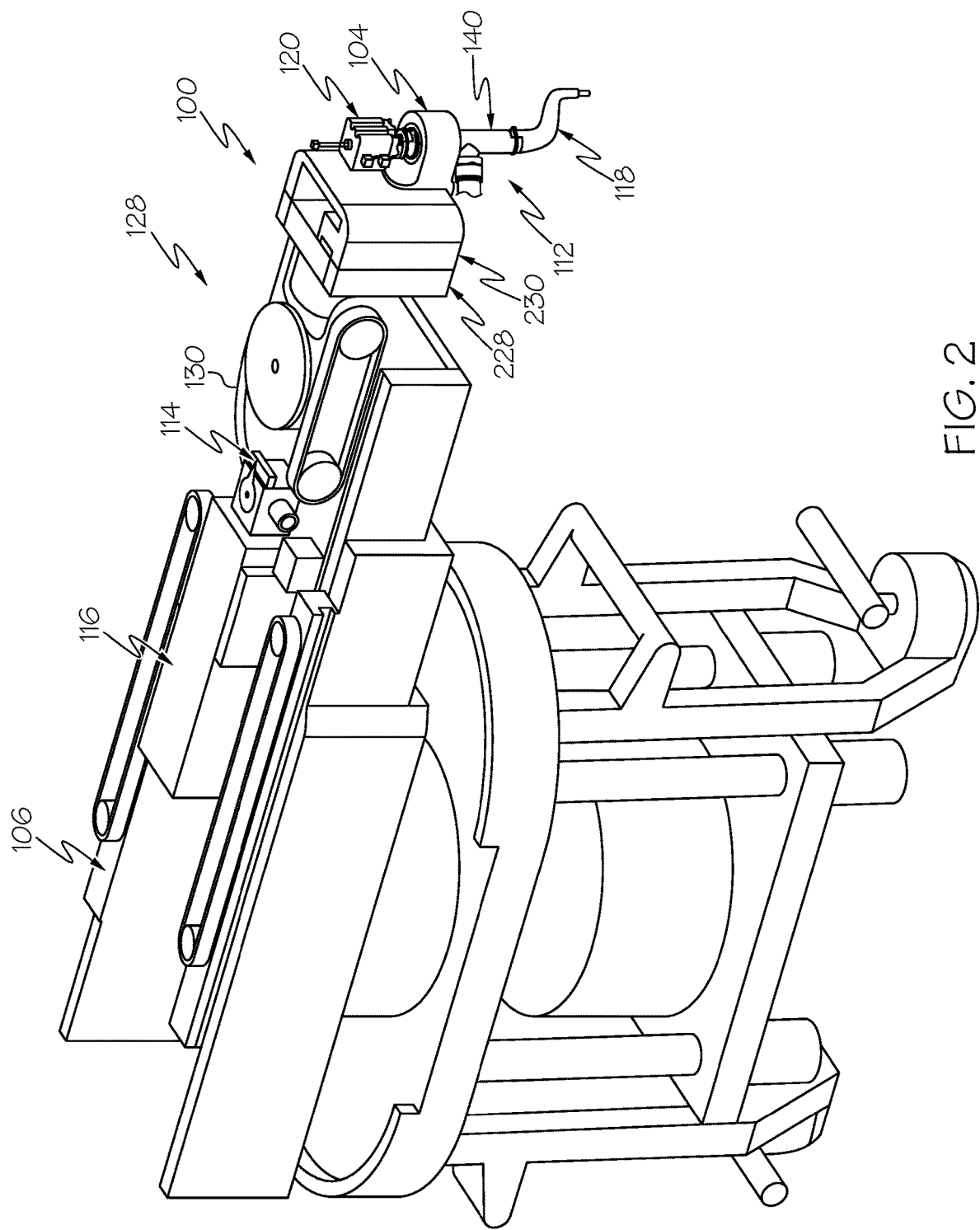
Figure 3:
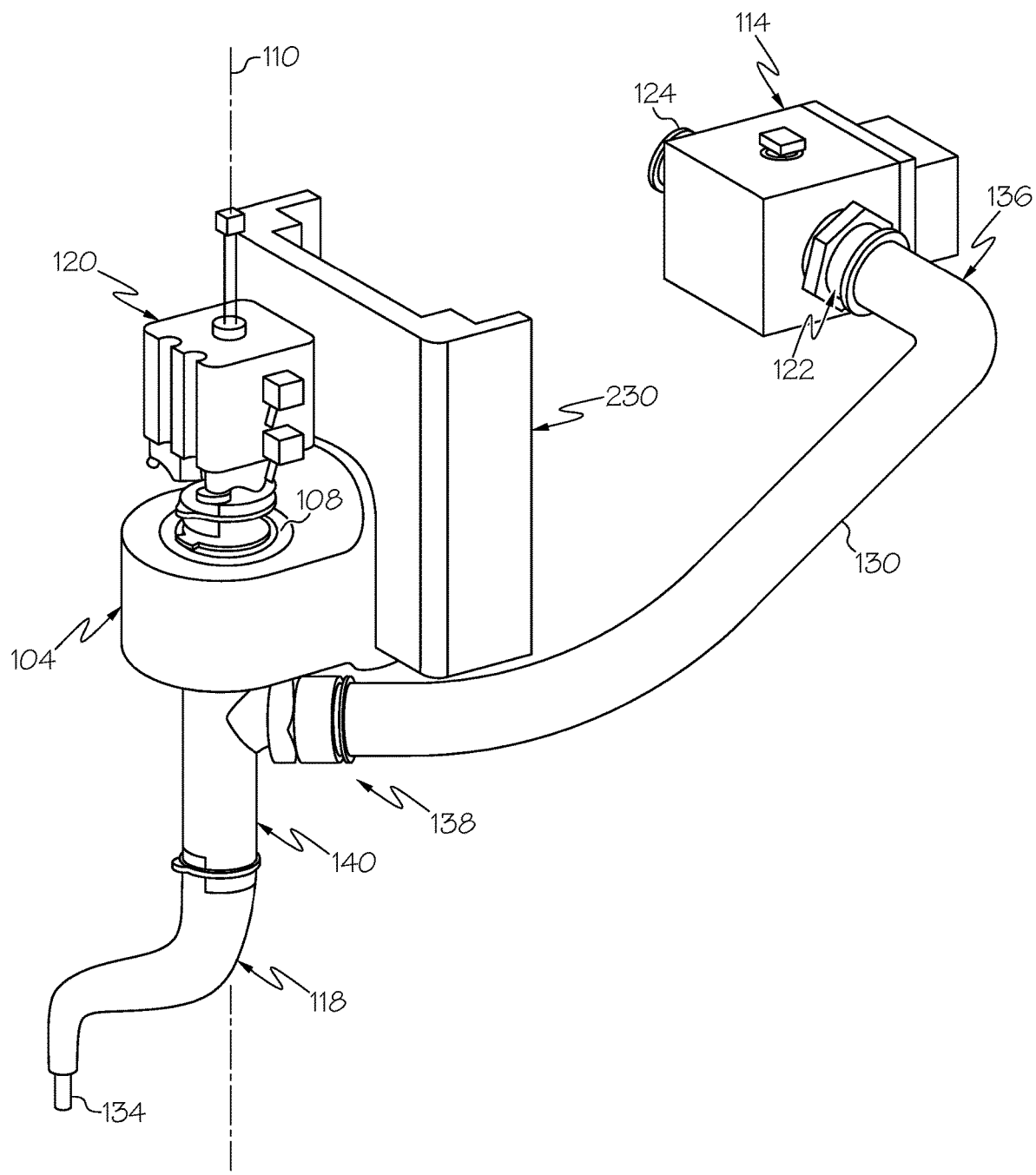
Figure 4:
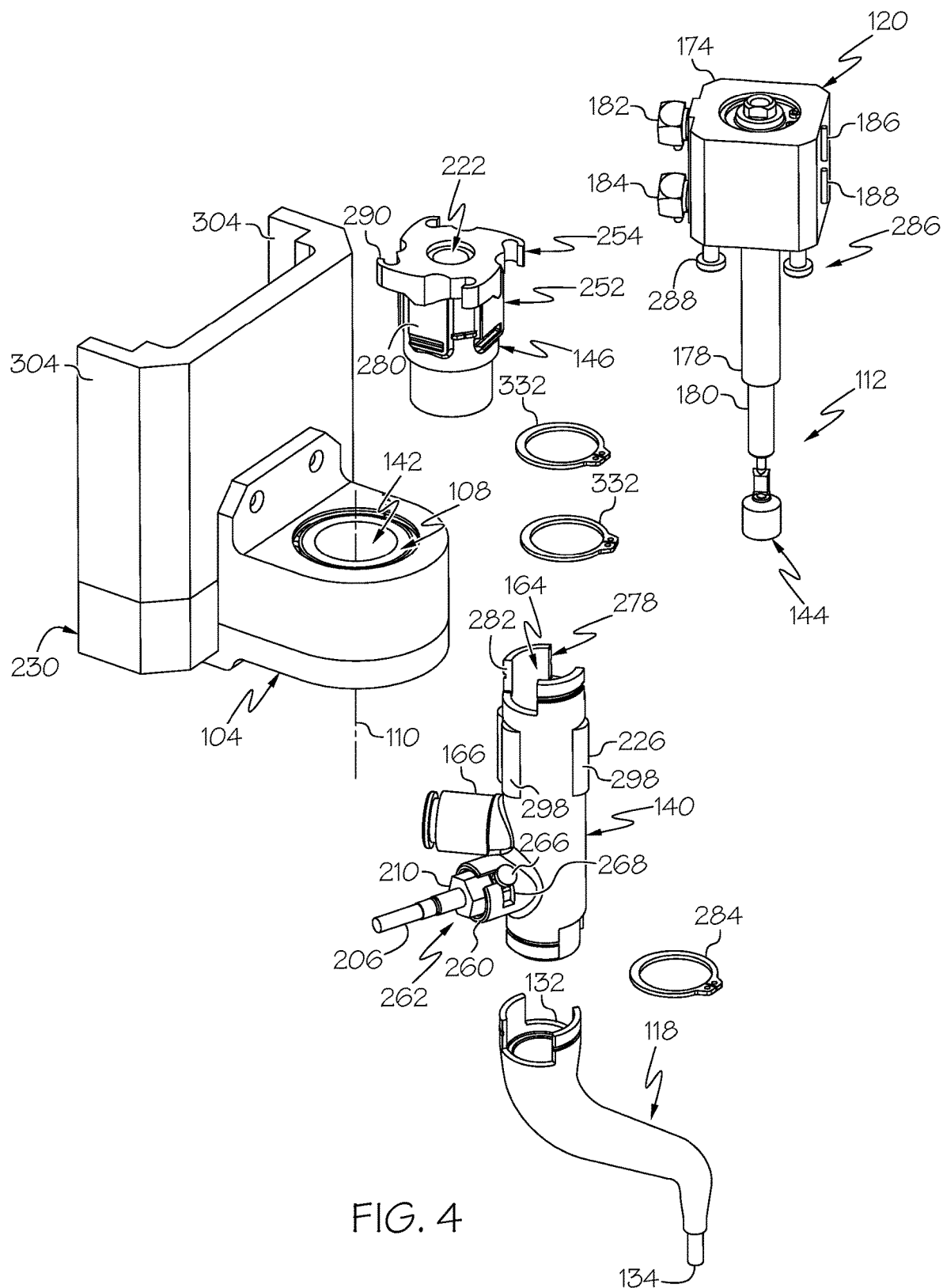
Figure 5:
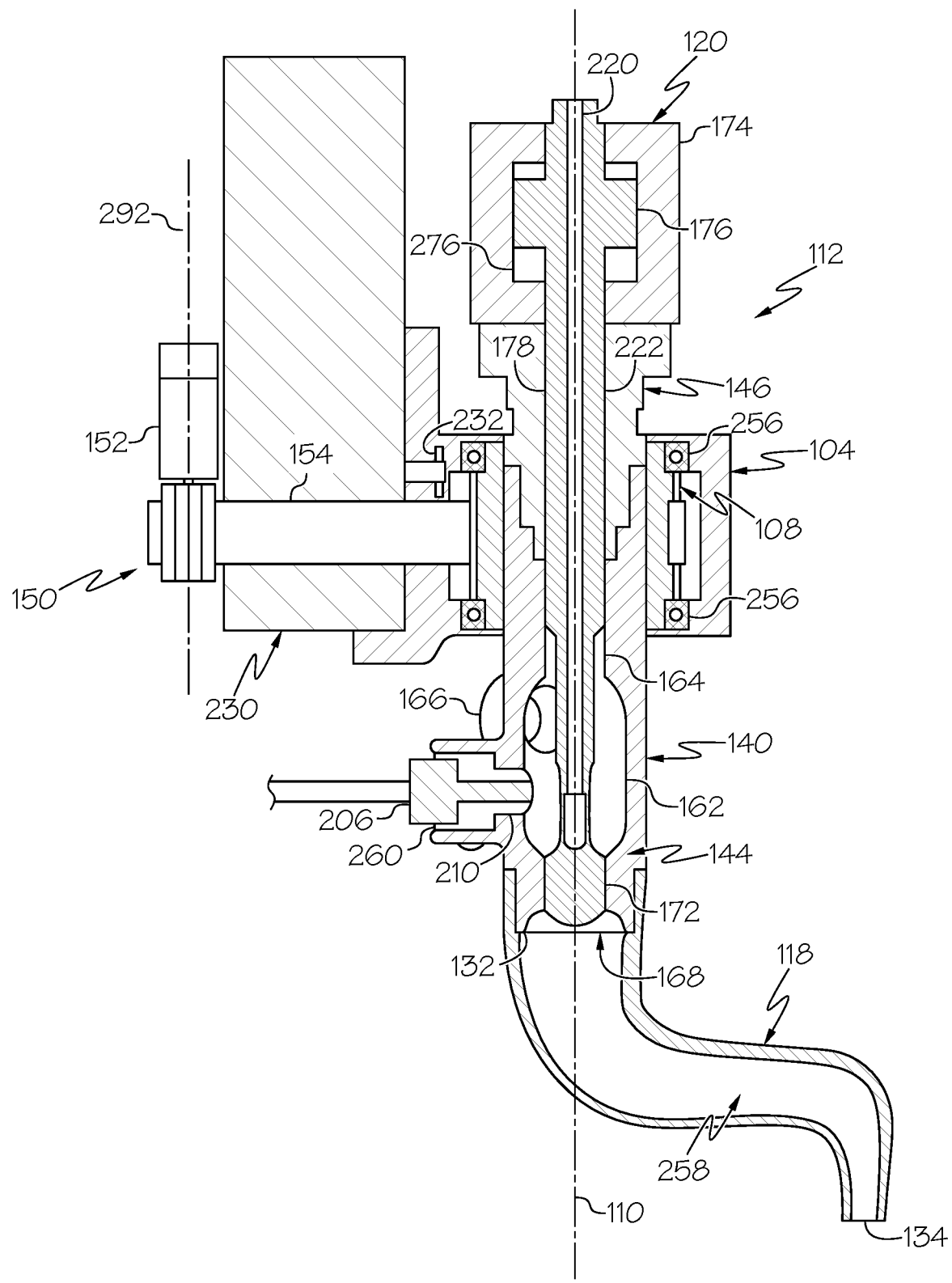
Figure 6:
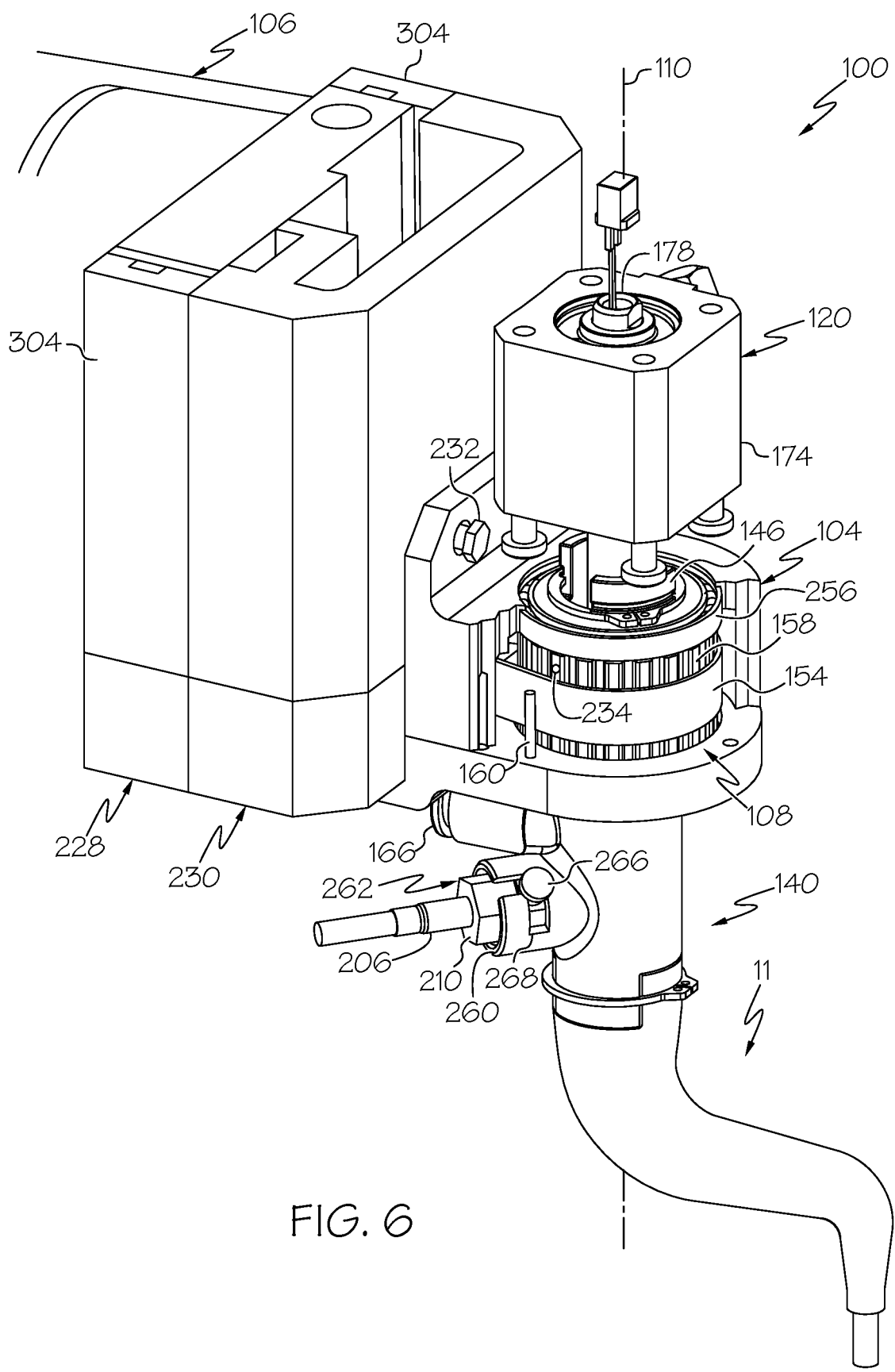
Figure 7:
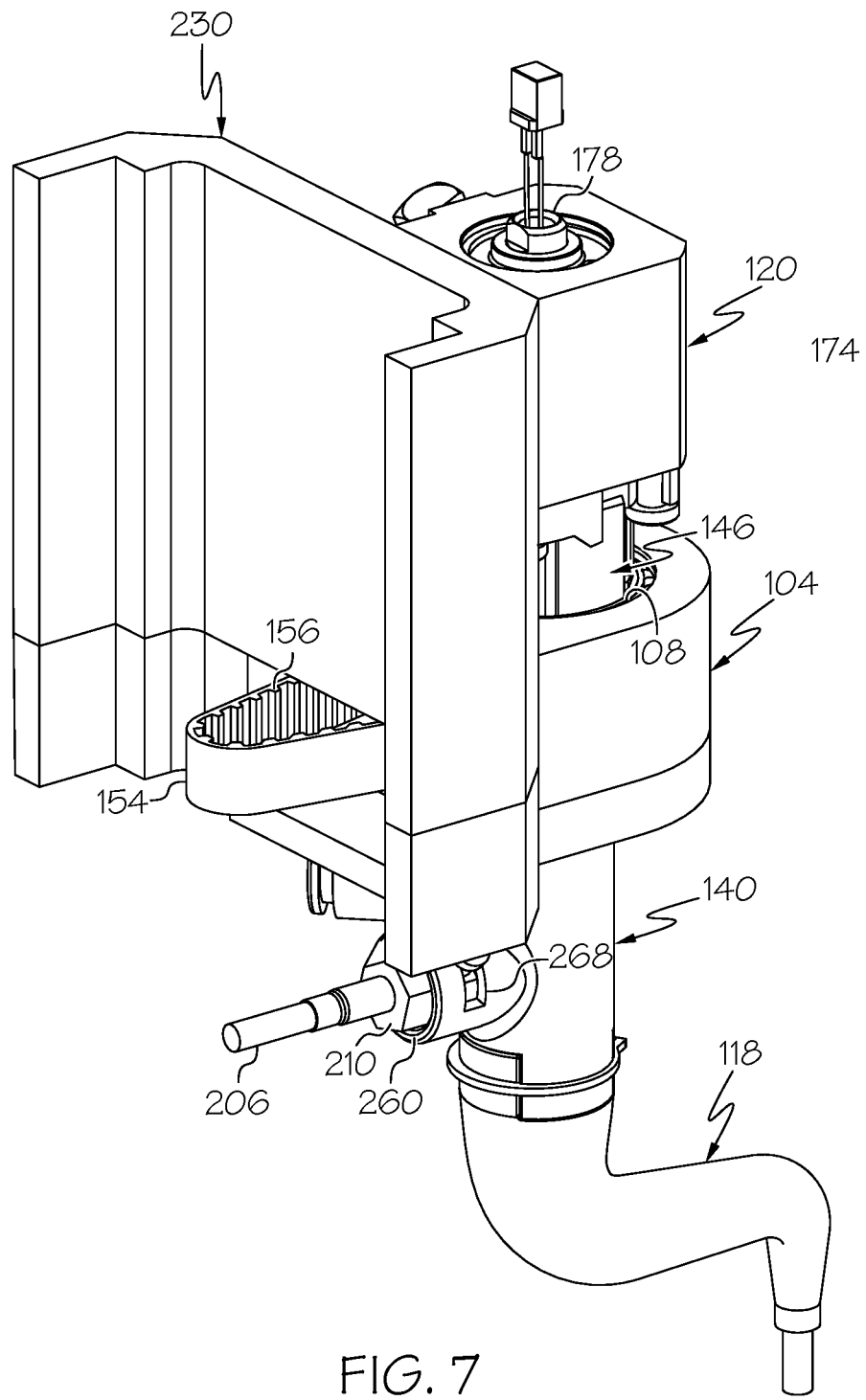
Figure 8:
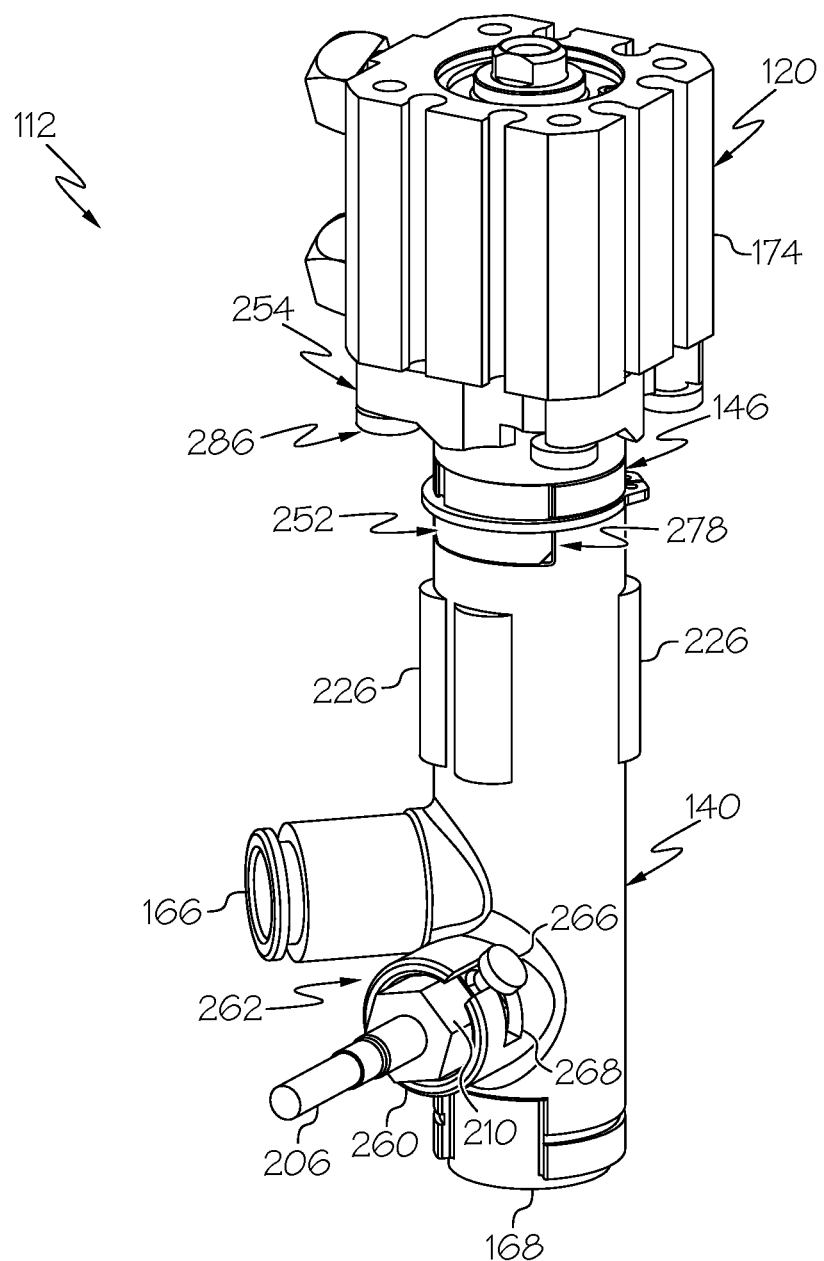
Figure 9:
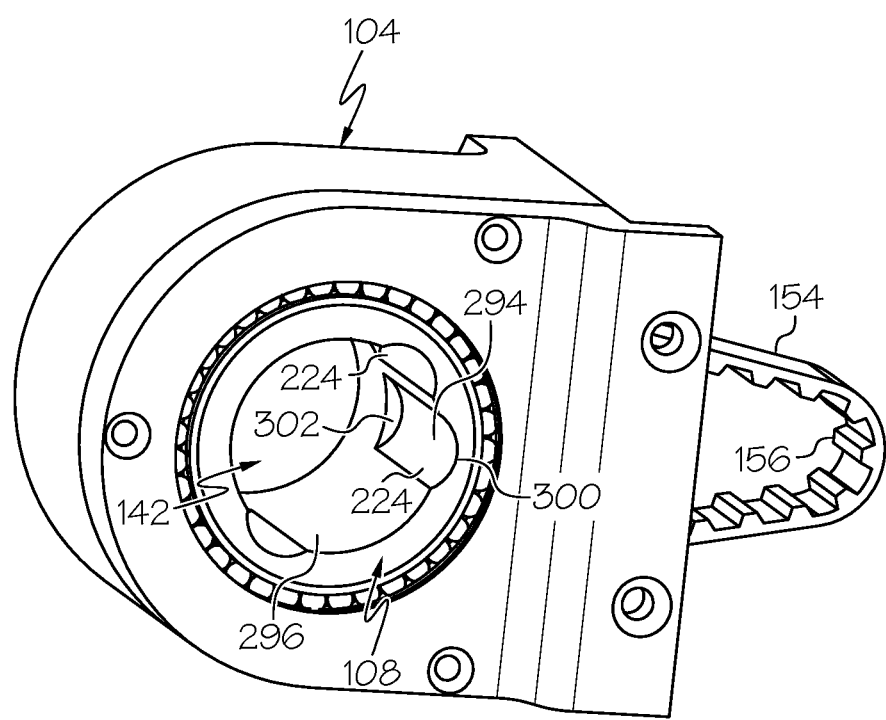
Figure 10:
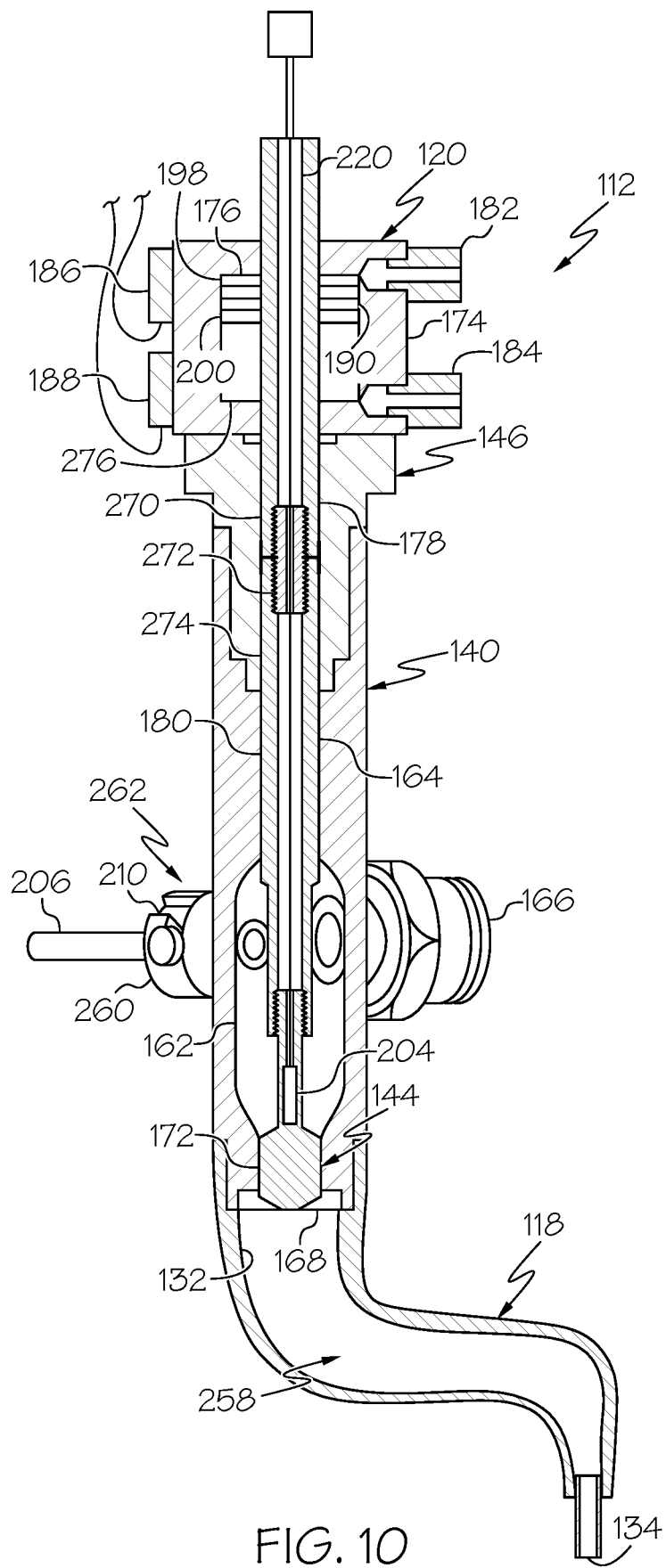
Figure 11:
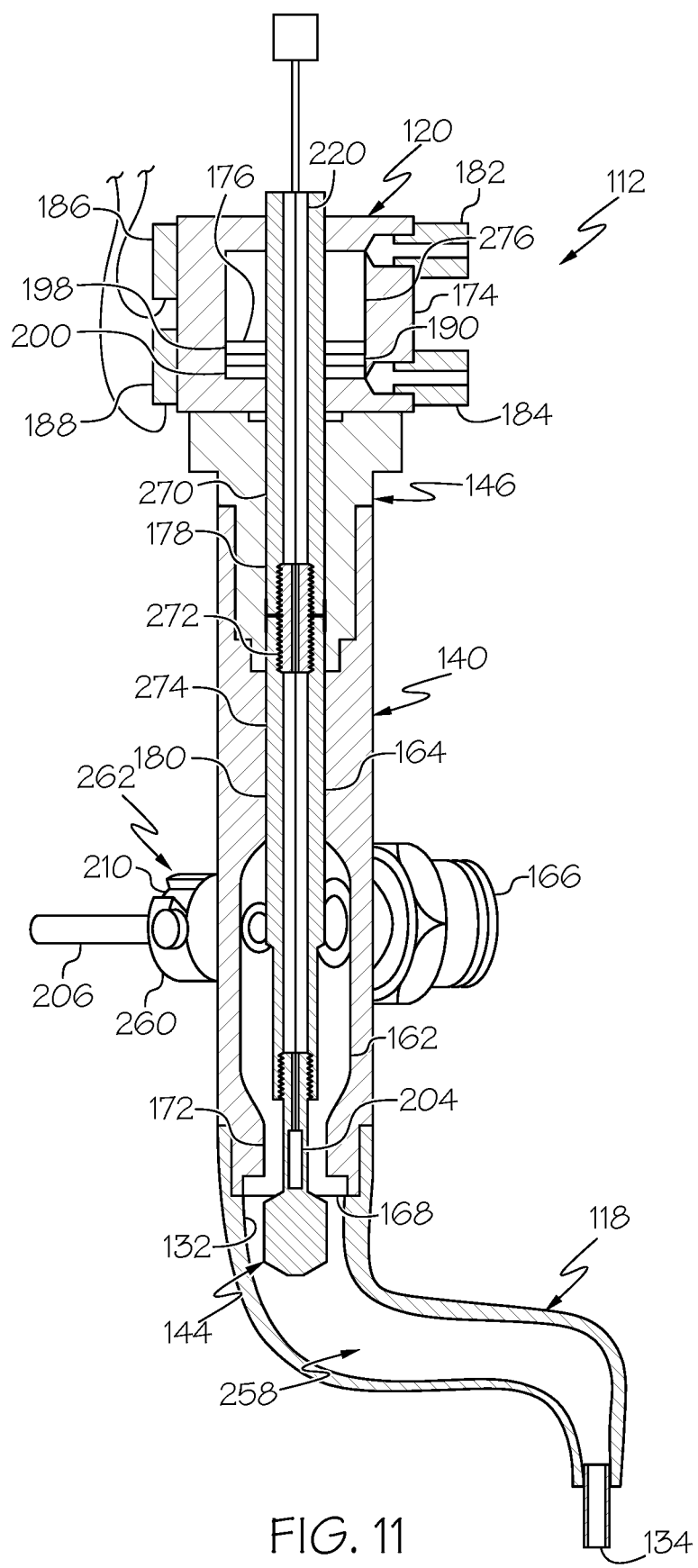
Figure 12:
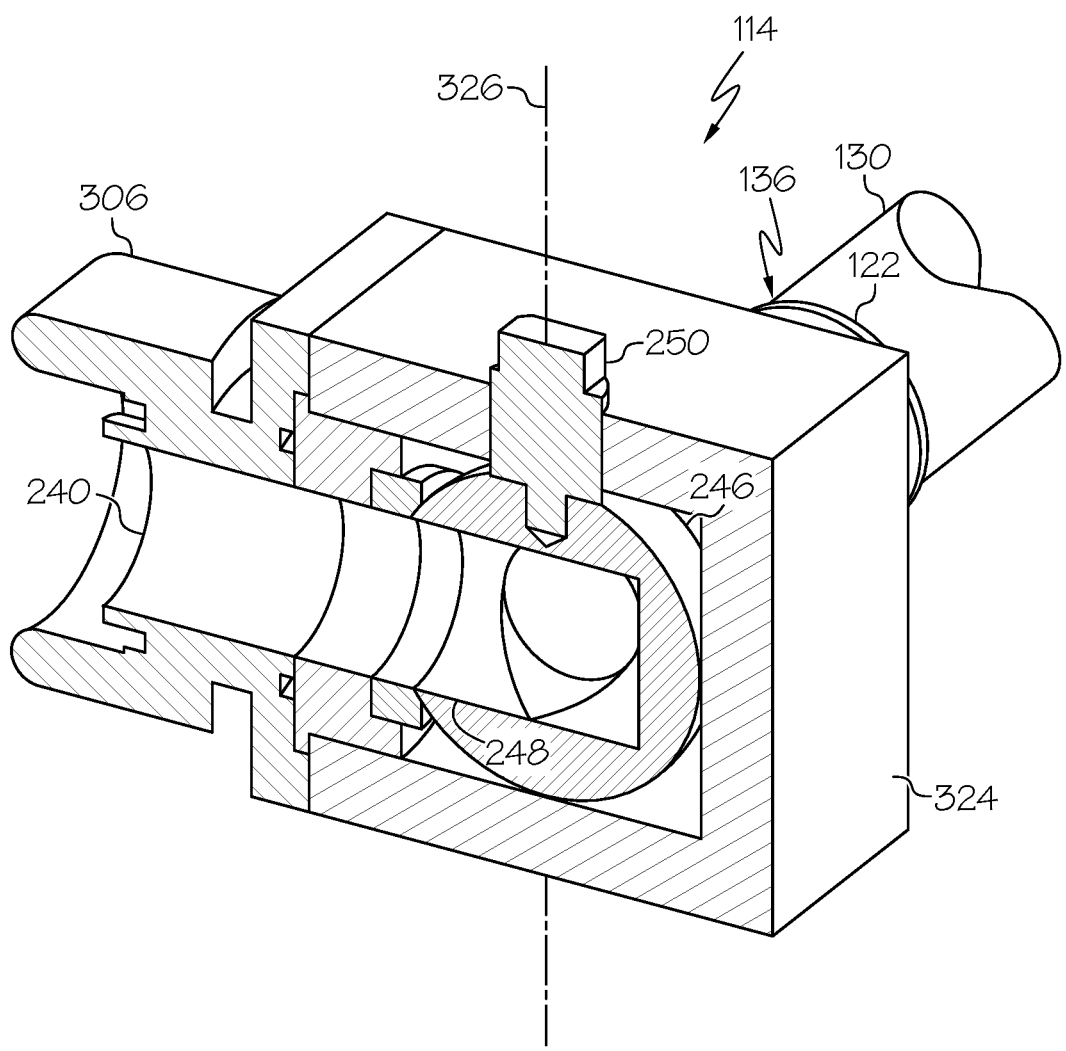
Figure 13:
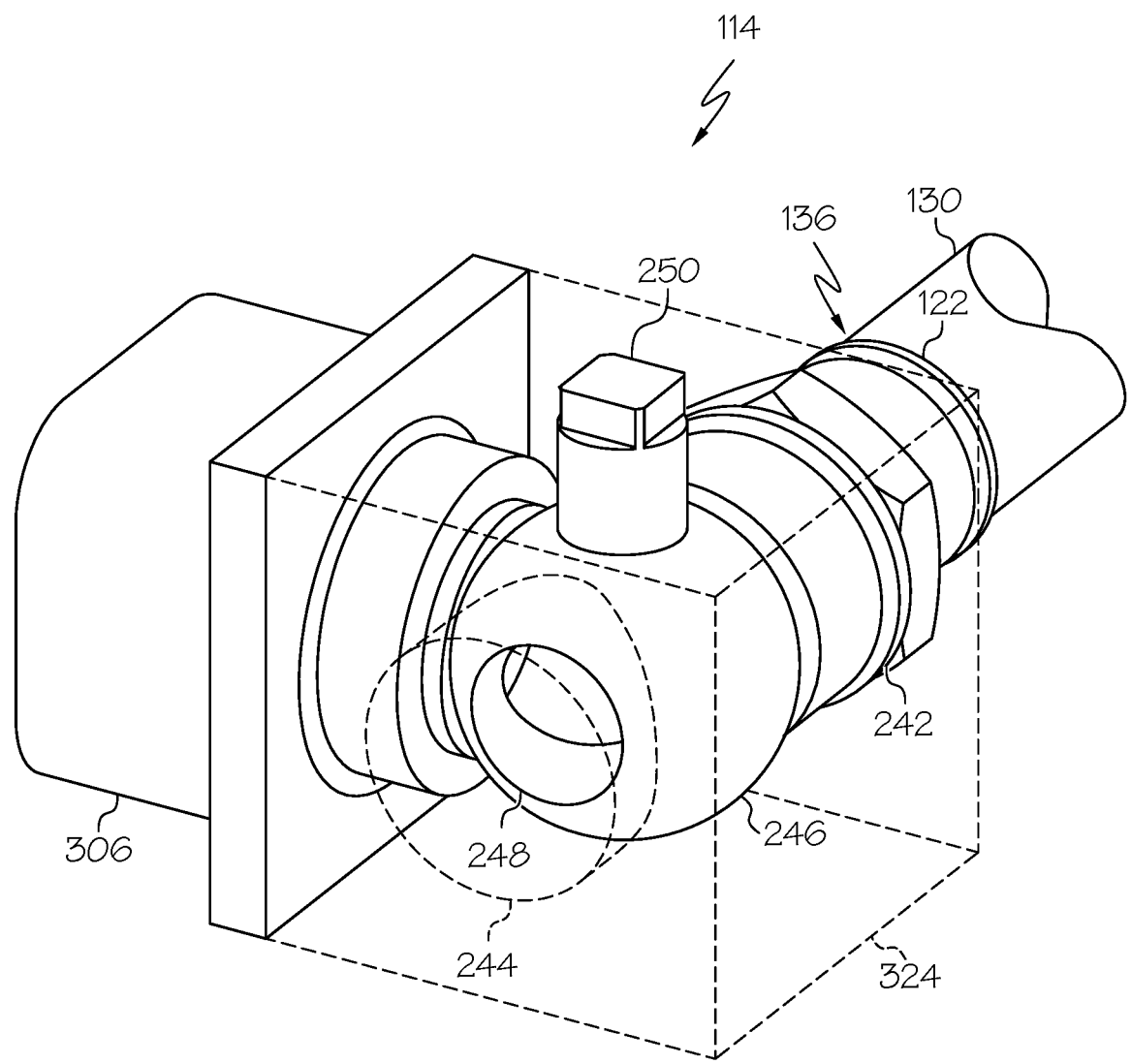
Figure 14:
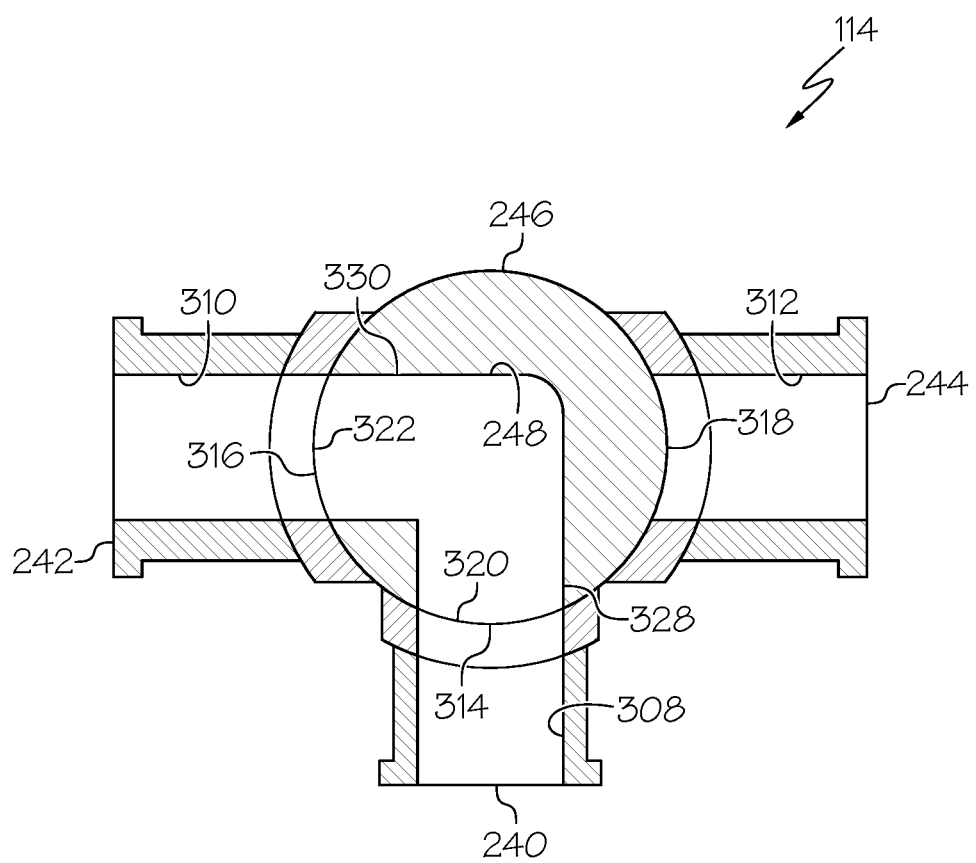
Figure 15:
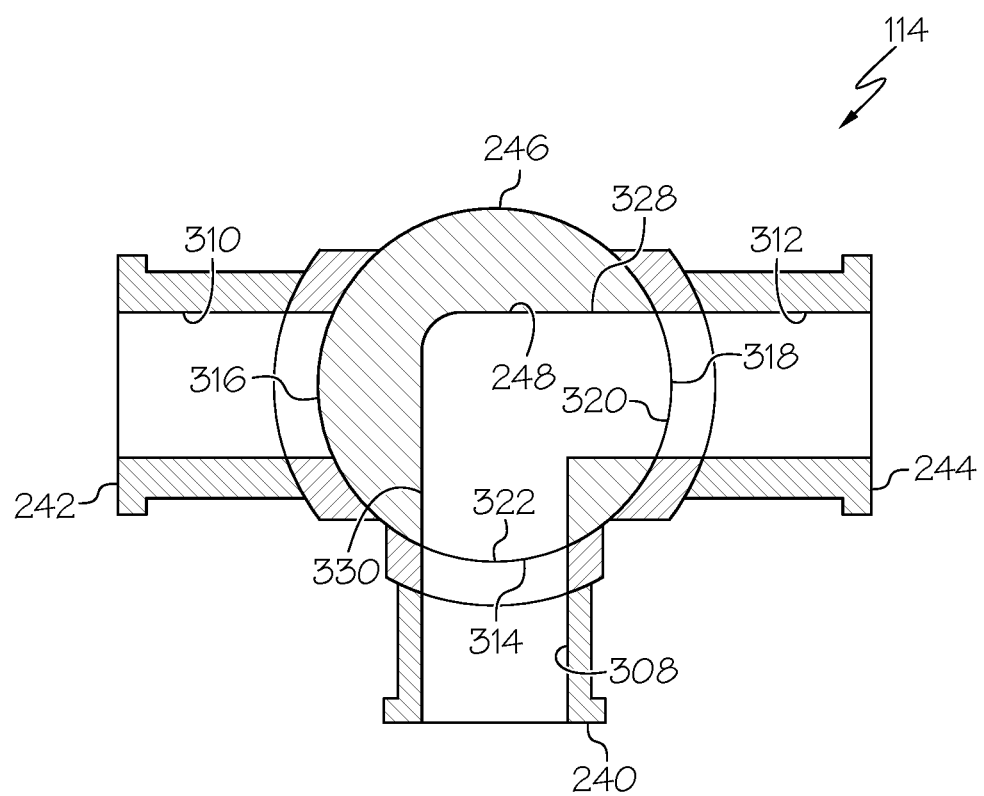
Figure 16:
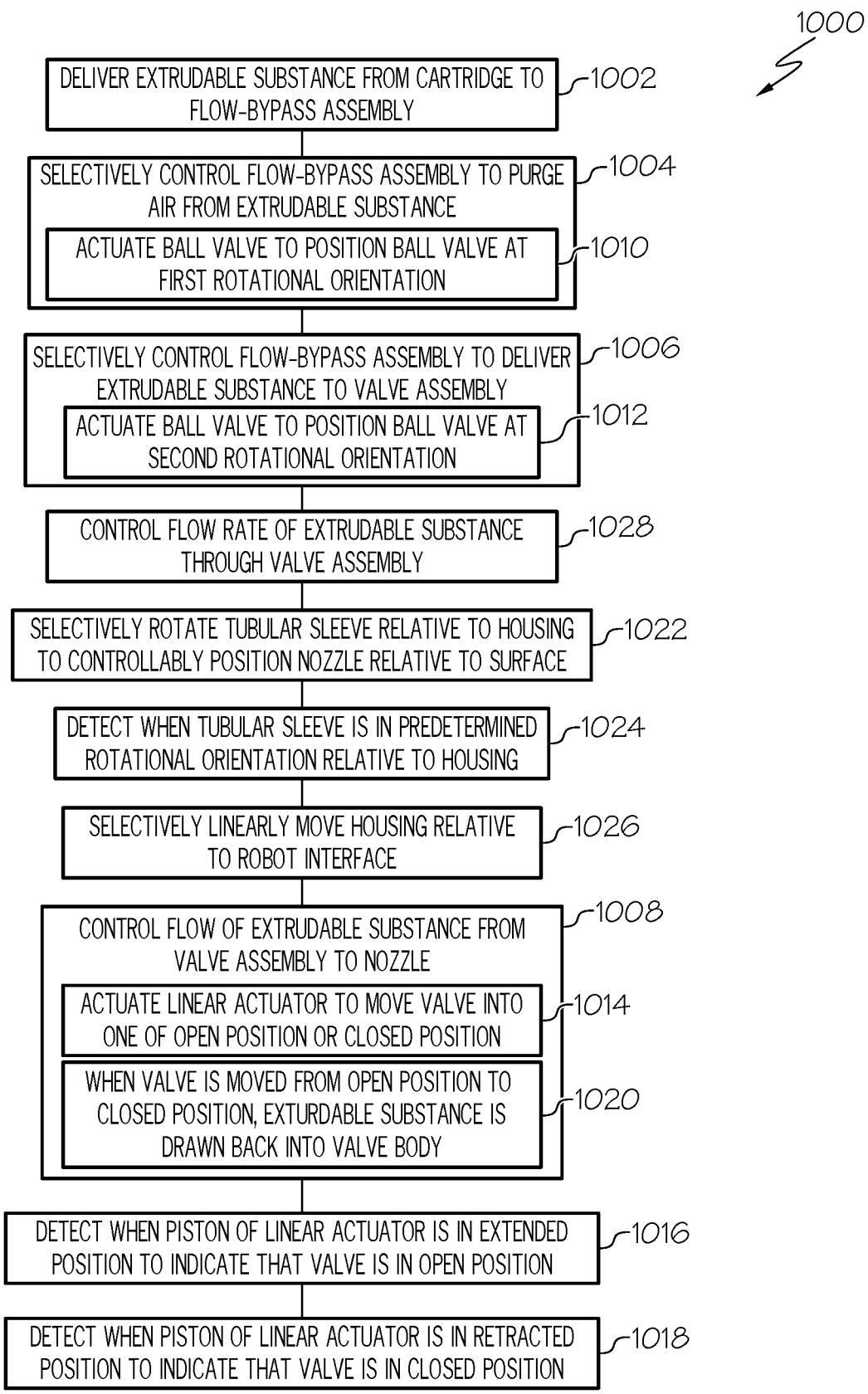
Figure 17:
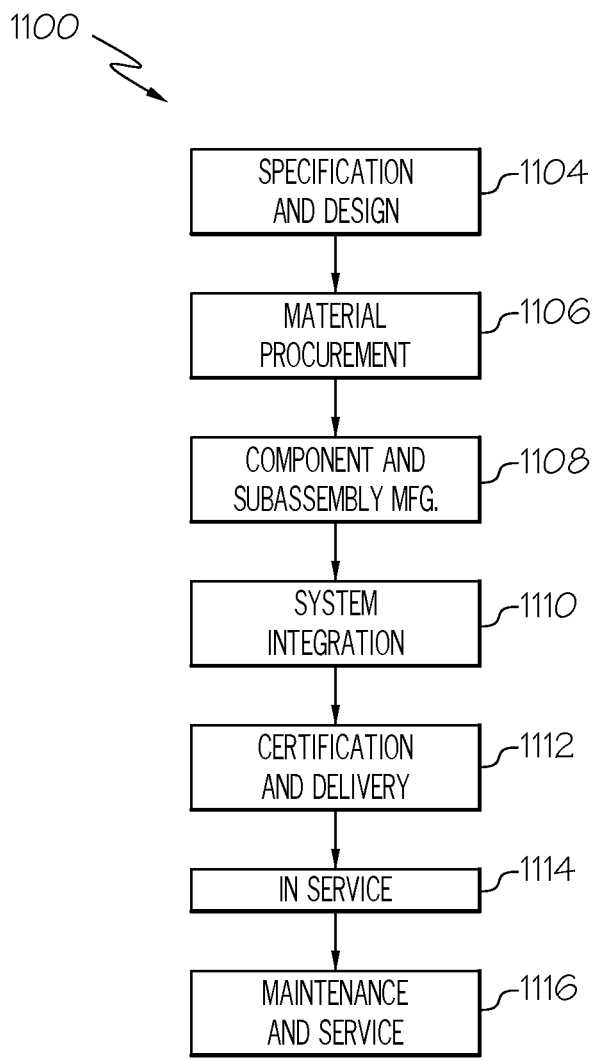

Having thus described one or more examples of the invention in general terms, reference will now be made to the accompanying drawings, which are not necessarily drawn to scale, and wherein like reference characters designate the same or similar parts throughout the several views, and wherein:

FIGS. 1A and 1B, collectively, are a block diagram of a system for depositing an extrudable substance, according to one or more examples of the present disclosure;

FIG. 2 is a schematic, perspective view of the system of FIGS. 1A and 1B, attached to a robot, according to one or more examples of the present disclosure;

FIG. 3 is a schematic, perspective view of a sub-assembly of the system of FIGS. 1A and 1B, according to one or more examples of the present disclosure;

FIG. 4 is a schematic, perspective, exploded view of a sub-assembly of the system of FIGS. 1A and 1B, according to one or more examples of the present disclosure;

FIG. 5 is a schematic, elevation, sectional view of a sub-assembly of the system of FIGS. 1A and 1B, according to one or more examples of the present disclosure;

FIG. 6 is a schematic, perspective, partial cut-away view of a sub-assembly of the system of FIGS. 1A and 1B, according to one or more examples of the present disclosure;

FIG. 7 is a schematic, perspective view of a sub-assembly of the system of FIGS. 1A, and 1B, according to one or more examples of the present disclosure;

FIG. 8 is a schematic, perspective view of a valve assembly of the system of FIGS. 1A and 1B, according to one or more examples of the present disclosure;

FIG. 9 is a schematic, perspective view of a bracket of the system of FIGS. 1A and 1B, according to one or more examples of the present disclosure;

FIG. 10 is a schematic, elevation, sectional view of a valve assembly and a nozzle of the system of FIGS. 1A and 1B, according to one or more examples of the present disclosure;

FIG. 11 is a schematic, elevation, sectional view of a valve assembly and a nozzle of the system of FIGS. 1A and 1B, according to one or more examples of the present disclosure;

FIG. 12 is a schematic, perspective, sectional view of a flow-bypass assembly of the system of FIGS. 1A and 1B, according to one or more examples of the present disclosure;

FIG. 13 is a schematic, perspective, partially transparent view of a flow-bypass assembly of the system of FIGS. 1A and 1B, according to one or more examples of the present disclosure;

FIG. 14 is a schematic, top plan, sectional view of a sub-assembly of a flow-bypass assembly of the system of FIGS. 1A and 1B, according to one or more examples of the present disclosure;

FIG. 15 is a schematic, top plan, sectional view of a sub-assembly of a flow-bypass assembly of the system of FIGS. 1A and 1B, according to one or more examples of the present disclosure;

FIG. 16 is a block diagram of a method of depositing an extrudable substance onto a surface utilizing the system and the apparatus of FIGS. 1A and 1B, according to one or more examples of the present disclosure;

FIG. 17 is a block diagram of aircraft production and service methodology; and

Figure 18:
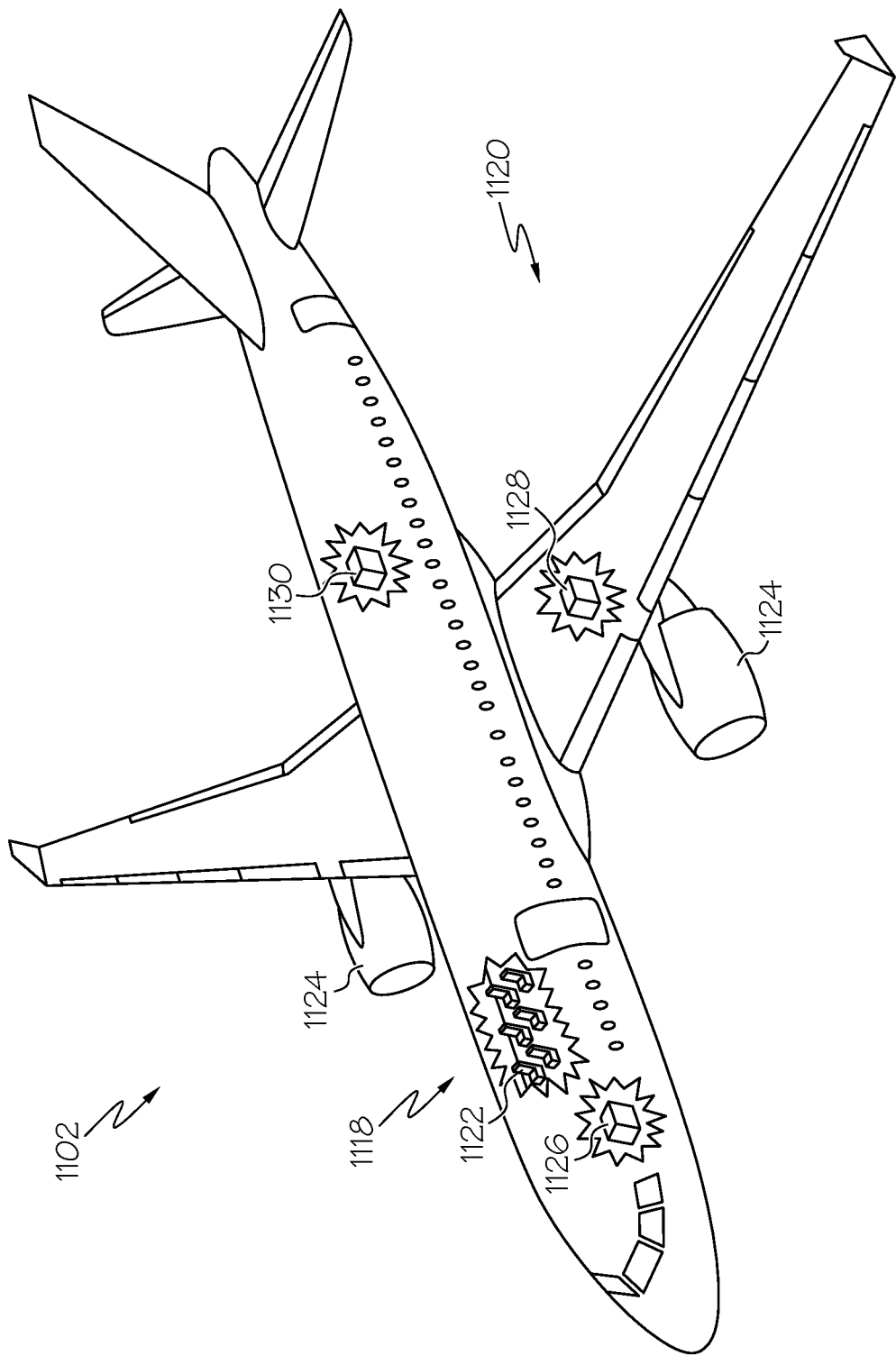

FIG. 18 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 16 and 17, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16 and 17 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 4-9, apparatus 100 for depositing extrudable substance 102 onto surface 126 is disclosed. Apparatus 100 comprises bracket 104, comprising opening 142 that has central axis 110. The apparatus 100 also comprises tubular sleeve 108, coupled to bracket 104 via opening 142 and rotatable relative to bracket 104 about central axis 110. Apparatus 100 further comprises valve assembly 112, comprising valve body 140, fixed to tubular sleeve 108 and rotatable relative to bracket 104 together with tubular sleeve 108. Valve assembly 112 also comprises valve 144, internal to valve body 140, and linear actuator 120, configured to position valve 144 relative to valve body 140. Apparatus 100 also comprises nozzle 118, fixed to valve body 140 and rotatable relative to bracket 104 together with valve body 140. The preceding subject matter of this paragraph characterizes example 1 of the present disclosure.

Apparatus 100 provides for depositing extrudable substance 102, though nozzle 118, to surface 126 of a workpiece, for example, located in a confined space. The configuration of tubular sleeve 108 and valve assembly 112 of apparatus 100 substantially reduces the size of apparatus 100. Rotation of tubular sleeve 108 enables controlling angular orientation of nozzle 118 relative to bracket 104 and surface 126 during deposition of extrudable substance 102 onto surface 126 at selective locations.

Apparatus 100 is configured to reduce the labor, time, and inaccuracies associated with the application of extrudable substance 102 onto surface 126 (and/or other surfaces) of the workpiece or other structures. Apparatus 100 is further configured to automate application of extrudable substance 102 within a confined space, such as within a wing box of an aircraft.

As used herein, extrudable substance 102 refers to any substance or material that is capable of being pressed, pushed, or otherwise forced out of an orifice while maintaining a cross-sectional shape approximately matching a cross-sectional shape of the orifice. Examples of extrudable substance 102 include, but are not limited to, sealants, adhesives, and fillers. Example purposes of extrudable substance 102 include, but are not limited to, sealing, filling, corrosion resistance, and/or fixation.

Generally, apparatus 100 functions as an automated end effector that is operably coupled with an end of robot 106 (FIG. 2) or other robotic arm mechanism and that is designed to interact with the environment by depositing extrudable substance 102 onto surface 126. Nozzle 118 is sealed to valve body 140 of valve assembly 112 to direct a flow of extrudable substance 102 from valve body 140 to surface 126. Linear actuator 120 of valve assembly 112 controls the flow of extrudable substance 102 from valve body 140 to nozzle 118 by selectively opening and closing valve 144 of valve assembly 112. In some examples, linear actuator 120 is any one of various linear actuators powered in any one of various ways, such as pneumatically, electrically, hydraulically, and the like.

In some examples, with tubular sleeve 108 coupled to bracket 104, tubular sleeve 108 circumscribes central axis 110. In some examples, with valve body 140 of valve assembly 112 fixed to tubular sleeve 108, valve body 140 is located within opening 142 and tubular sleeve 108 circumscribes and circumferentially engages at least a portion of valve body 140. In some examples, tubular sleeve 108 and at least a portion of valve body 140 each has a circular cross-sectional shape. In some other examples, tubular sleeve 108 and at least a portion of valve body 140 each has an elliptical cross-sectional shape.

In some examples, tubular sleeve 108 is coupled to bracket 104 in any manner suitable to enable rotation of tubular sleeve 108 about central axis 110 relative to bracket 104. In some examples, apparatus 100 also includes one or more annular bearings 256 coupled to an exterior of tubular sleeve 108. In an example, a first one of annular bearings 256 is located at one end of tubular sleeve 108 and a second one of annular bearings 256 is located at the other end of tubular sleeve 108.

Referring generally to FIGS. 1A and 1B and particularly to, e.g., FIGS. 4-6, 10, and 11, nozzle 118 comprises nozzle inlet 132, communicatively coupled with valve body 140, and nozzle outlet 134, laterally offset from nozzle inlet 132 relative to central axis 110. The preceding subject matter of this paragraph characterizes example 2 of the present disclosure, wherein example 2 also includes the subject matter according to example 1, above.

Nozzle outlet 134 being laterally offset from nozzle inlet 132 relative to central axis 110 enables disposition of extrudable substance 102 at a location on surface 126 that is laterally offset relative to valve outlet port 168 and central axis 110. In some examples, nozzle 118 includes nozzle channel 258, extending between nozzle inlet 132 and nozzle outlet 134. Controllably adjusting angular orientation of nozzle 118 about central axis 110 relative to bracket 104, in response to rotation of nozzle 118 together with valve assembly 112, controllably positions nozzle outlet 134 relative to surface 126.

Referring generally to FIGS. 1A and 1B and particularly to, e.g., FIGS. 10 and 11, valve body 140 comprises valve chamber 162, valve inlet port 166, communicatively coupled with valve chamber 162, and valve outlet port 168, coaxial with valve chamber 162 and communicatively coupled with valve chamber 162. Valve body 140 further comprises valve seat 172, located between valve chamber 162 and valve outlet port 168. Valve body 140 also comprises valve passage 164, coaxial with valve chamber 162 and located opposite valve outlet port 168. Valve inlet port 166 is configured to be communicatively coupled with cartridge 116, configured to contain extrudable substance 102. Valve outlet port 168 is configured to be communicatively coupled to nozzle 118. Valve passage 164 is communicatively coupled with valve chamber 162. The preceding subject matter of this paragraph characterizes example 3 of the present disclosure, wherein example 3 also includes the subject matter according to example 1 or 2, above.

Valve inlet port 166, valve chamber 162 and valve outlet port 168 define a flow path for extrudable substance through valve body 140 of valve assembly 112. Valve inlet port 166 sealing engages with cartridge 116, containing extrudable substance 102. Valve outlet port 168 sealing engages with nozzle 118. Valve seat 172 provides a sealable interface between valve chamber 162 and valve outlet port 168. Selective sealing engagement of valve seat 172 by valve 144 segregates valve chamber 162 and valve outlet port 168 and blocking the flow path of extrudable substance 102 from valve inlet port 166 to valve outlet port 168 through valve chamber 162. Valve passage 164 provides access to valve seat 172 by linear actuator 120 through valve chamber 162. Access of linear actuator 120 to valve seat 172 controls the flow of extrudable substance 102 through valve body 140 by selectively positioning valve 144 relative to valve seat 172.

In some examples, valve inlet port 166 includes a gasket, configured to form a seal between valve inlet port 166 and cartridge 116. In some examples, nozzle inlet 132 is coaxially aligned with valve outlet port 168. In some examples, valve outlet port 168 includes a gasket, configured to form a seal between valve outlet port 168 and nozzle 118. In some examples, at least one snap ring (e.g., second snap ring 284) is circumferentially coupled to valve body 140 and nozzle 118 to retain nozzle 118 coupled to valve body 140. In some other examples, other types of couplings and/or fasteners are used to couple nozzle 118 to valve body 140.

Referring generally to FIGS. 1A and 1B and particularly to, e.g., FIGS. 10 and 11, linear actuator 120 comprises barrel 174, removably coupled with valve body 140, and piston 176, movable along central axis 110 within barrel 174 between an extended position and a retracted position. Linear actuator 120 further comprises actuator rod 178, coupled to piston 176 and extending through valve passage 164 into valve chamber 162. Valve 144 is coupled to actuator rod 178. With piston 176 in the extended position, valve 144 is located within valve outlet port 168 and does not sealingly engage valve seat 172. With piston 176 in the retracted position, valve 144 sealingly engages valve seat 172. The preceding subject matter of this paragraph characterizes example 4 of the present disclosure, wherein example 4 also includes the subject matter according to example 3, above.

Linear actuator 120 enables precise control of flow rate of extrudable substance 102 out of valve body 140 and into nozzle 118. Linear actuator 120 enables the flow of extrudable substance 102 from valve outlet port 168 by selectively positioning valve 144 in an open position, in which valve 144 is positioned beyond, or at least partially within, valve outlet port 168 and is not sealingly engaged with valve seat 172, when piston 176 is moved into the extended position (FIG. 11). Linear actuator 120 restricts the flow of extrudable substance 102 from valve outlet port 168 by selectively positioning valve 144 in a closed position, in which valve 144 is position at least partially within valve seat 172 and is sealingly engaged with valve seat 172, when piston 176 is moved into the retracted position (FIG. 10).

In some examples, valve 144 includes a plug body that is coupled to an end of actuator rod 178 and is configured to fit within valve seat 172. In some examples, at least a portion of the plug body of valve 144 has a cross-sectional shape matching a cross-sectional shape of valve seat 172 and is sized in close tolerance to valve seat 172, such that a perimeter of valve seat 172 circumferentially seals with at least a portion of the plug body of valve 144 when valve 144 is in the closed position.

Referring generally to FIGS. 1A and 1B and particularly to, e.g., FIGS. 4, 10, and 11, actuator rod 178 comprises plug 180, positioned within valve passage 164. The preceding subject matter of this paragraph characterizes example 5 of the present disclosure, wherein example 5 also includes the subject matter according to example 4, above.

Plug 180 enables restriction of a flow of extrudable substance 102 from valve chamber 162 into valve passage 164. In other words, plug 180 being positioned within valve passage 164 prevents backflow of extrudable substance 102 from valve chamber 162 into valve passage 164 as extrudable substance 102 flows through valve body 140 and during actuation of linear actuator 120 (e.g., as actuator rod 178 and plug 180 move relative to valve body 140).

In some examples, actuator rod 178 includes first rod body 270, coupled to piston 176, coupling 272, coupled to first rod body 270, opposite piston 176, and second rod body 274, coupled to coupling 272, opposite first rod body 270. In some examples, plug 180 is coupled to second rod body 274. In some other examples, second rod body 274 forms plug 180. In some examples, valve 144 is coupled to second rod body 274, opposite coupling 272. In some examples, valve 144 is spaced away from plug 180. In some examples, valve 144 includes a valve stem, coupled to second rod body 274. The plug body of valve 144 is coupled to an end of the valve stem of valve 144, opposite second rod body 274.

In some examples, actuator rod 178 being multi-sectional, or a multi-component, assembly, enables actuator rod 178 to be constructed in accordance with the particular application and/or configuration of valve body 140. In some examples, coupling 272 is a threaded coupling, configured to be threadably coupled to first rod body 270 and second rod body 274. In some examples, valve 144 is threadably coupled to second rod body 274.

Referring generally to FIGS. 1A and 1B and particularly to, e.g., FIGS. 5, 10, and 11, apparatus 100 further comprises temperature sensor 204, configured to be in communication with extrudable substance 102 within valve chamber 162 of valve body 140 when extrudable substance 102 is introduced within valve chamber 162. The preceding subject matter of this paragraph characterizes example 6 of the present disclosure, wherein example 6 also includes the subject matter according to example 4 or 5, above.

Temperature sensor 204 enables detection of temperature of extrudable substance 102 within valve chamber 162 of valve body 140. In some examples, the temperature of extrudable substance 102 within valve body 140 that is detected by temperature sensor 204 is used to control the rate at which extrudable substance 102 flows from cartridge 116 to valve body 140. Additionally, in some examples, the temperature of extrudable substance 102 within valve body 140 that is detected by temperature sensor 204 is used to control actuation of linear actuator 120 to regulate the rate at which extrudable substance 102 flows from valve body 140 to nozzle 118.

Referring generally to FIGS. 1A and 1B and particularly to, e.g., FIGS. 5, 10, and 11, apparatus 100 further comprises pressure sensor 206, configured to be in communication with extrudable substance 102 within valve chamber 162 of valve body 140 when extrudable substance 102 is introduced within valve chamber 162. The preceding subject matter of this paragraph characterizes example 7 of the present disclosure, wherein example 7 also includes the subject matter according to example 6, above.

Pressure sensor 206 enables detection of pressure of extrudable substance 102 within valve chamber 162 of valve body 140. In some examples, the pressure of extrudable substance 102 within valve body 140 that is detected by pressure sensor 206 is used to control the rate at which extrudable substance 102 flows from cartridge 116 to valve body 140. Additionally, in some examples, the pressure of extrudable substance 102 within valve body 140 that is detected by pressure sensor 206 is used to control actuation of linear actuator 120 to regulate the rate at which extrudable substance 102 flows from valve body 140 to nozzle 118.

In some examples, pressure sensor 206 is configured to be removably coupled to valve body 140. In some examples, valve body 140 includes pressure-sensor port 260. Pressure-sensor port 260 is in communication with valve chamber 162. Pressure sensor 206 is at least partially located within pressure-sensor port 260 such that pressure sensor 206 is in communication with extrudable substance 102 within valve chamber 162 of valve body 140 when extrudable substance 102 is introduced within valve chamber 162.

Referring generally to FIGS. 1A and 1B and particularly to, e.g., FIGS. 4-8, 10, and 11, apparatus 100 further comprises pressure-sensor housing 210, configured to house pressure sensor 206. Pressure-sensor housing 210 is configured to be removably coupled to valve body 140 to communicatively couple pressure sensor 206 with extrudable substance 102 within valve chamber 162 of valve body 140. The preceding subject matter of this paragraph characterizes example 8 of the present disclosure, wherein example 8 also includes the subject matter according to example 7, above.

Pressure-sensor housing 210 enable simple, easy, and effective coupling of pressure sensor 206 to valve body 140 in communication with extrudable substance 102 within valve chamber 162. Pressure-sensor housing 210 is configured to support and retain pressure sensor 206. Pressure-sensor housing 210 releasably locks pressure sensor 206 being with valve body 140 such that pressure sensor 206 is in contact with extrudable substance 102 located within valve chamber 162 of valve body 140.

In some examples, valve body 140 includes a pressure-sensor receptacle that is cross-sectionally complementary to pressure-sensor housing 210 and is configured to receive and retain pressure-sensor housing 210. The pressure-sensor receptacle opens into pressure-sensor port 260 such that pressure sensor 206 extends into valve chamber 162, in communication with extrudable substance 102, when pressure-sensor housing 210 is received by and coupled to the pressure-sensor receptacle.

In some examples, pressure-sensor housing 210 and valve body 140 are couplable via interlocking interface 262 to enable pressure sensor 206 to be easily and securely coupled to valve body 140 in communication with valve chamber 162 and/or easily decoupled from valve body 140. In some examples, interlocking interface 262 is a twist-lock interface. In an example, pressure-sensor housing 210 includes at least one twist-lock retainer 266 and valve body 140 includes at least one twist-lock groove 268, for example, formed in the pressure-sensor receptacle. Twist-lock groove 268 is configured to receive and retain twist-lock retainer 266 upon insertion of pressure-sensor housing 210 into pressure-sensor receptacle and a twisting action of pressure-sensor housing 210 relative to valve body 140. In an example, twist-lock retainer 266 includes a shaft, projecting outward from pressure-sensor housing 210, and a disk-like head, located at an end of the shaft. In an example, twist-lock retainer 266 is a shoulder bolt, coupled to pressure-sensor housing 210. In some other examples, interlocking interface 262 is a threaded interface. In some other examples, other types of couplings and/or fasteners are used to couple pressure sensor 206 to valve body 140 in communication with valve chamber 162.

Referring generally to FIGS. 1A and 1B, apparatus 100 further comprises controller 208, operatively coupled with at least one of temperature sensor 204 or pressure sensor 206 to control, based on signals, obtained from at least one of temperature sensor 204 or pressure sensor 340, flow rate of extrudable substance 102 through valve body 140. The preceding subject matter of this paragraph characterizes example 9 of the present disclosure, wherein example 9 also includes the subject matter according to example 7 or 8, above.

Use of at least one of temperature sensor 204 or pressure sensor 206 to control the flow rate of extrudable substance 102 through valve body 140 enables precise and predictable flow of extrudable sub stance 102.

In some examples, controller 208 includes at least one electronic controller, such as a programmable processor. In some examples, controller 208 is operatively coupled with linear actuator 120 to control actuation of linear actuator 120 to selectively position valve 144 in one of the open position or the closed position to control flow of extrudable substance 102 through valve body 140. In some examples, controller 208 is operatively coupled with a delivery mechanism that urges extrudable substance 102 from cartridge 116 to valve body 140 to control the flow of extrudable substance 102 to valve assembly 112.

Referring generally to FIGS. 1A and 1B, apparatus 100 further comprises temperature-signal conditioner 212, electrically coupled to temperature sensor 204, and pressure-signal conditioner 214, electrically coupled to pressure sensor 206. Apparatus 100 also comprises input/output connector 216, communicatively coupling at least one of temperature-signal conditioner 212 or pressure-signal conditioner 214 with controller 208. The preceding subject matter of this paragraph characterizes example 10 of the present disclosure, wherein example 10 also includes the subject matter according to example 9, above.

Temperature-signal conditioner 212 enables communication of temperature-related information from temperature sensor 204 to controller 208 in a format, usable by controller 208. Pressure-signal conditioner 214 enables communication of pressure-related information from pressure sensor 206 to controller 208 in a format, usable by controller 208. Input/output connector 216 enables electrical communication between controller 208 and at least one of temperature-signal conditioner 212 or pressure-signal conditioner 214. In an example, temperature-signal conditioner 212 provides data format conversion functionality on-board apparatus 100, rather than at controller 208. In an example, pressure-signal conditioner 214 provides data format conversion functionality on-board apparatus 100, rather than at controller 208. Input/output connector 216 provides a convenient and reliable electrical connection between controller 208 and at least one of temperature-signal conditioner 212 and pressure-signal conditioner 214.

Referring generally to FIGS. 1A and 1B and particularly to, e.g., FIGS. 4, 10, and 11, apparatus 100 further comprises pressure source 218, operatively coupled with controller 208. Linear actuator 120 further comprises first actuator pressure input 182, configured to communicate pneumatic pressure from pressure source 218 to linear actuator 120 to move piston 176 to the extended position. Linear actuator 120 additionally comprises second actuator pressure input 184, configured to communicate pneumatic pressure from pressure source 218 to linear actuator 120 to move piston 176 to the retracted position, which is spaced away from the extended position of piston 176. The preceding subject matter of this paragraph characterizes example 11 of the present disclosure, wherein example 11 also includes the subject matter according to example 9 or 10, above.

Pressure source 218 enables pneumatic control and pneumatic actuation of linear actuator 120. First actuator pressure input 182 and second actuator pressure input 184 enable double-action of linear actuator 120 and delivery of pneumatic pressure to drive linear movement of piston 176 relative to barrel 174.

In some examples, apparatus 100 also includes pressure tubes (not illustrated) to communicate pneumatic pressure to and from linear actuator 120. In an example, the pressure tubes communicate pressure to and from first actuator pressure input 182 and second actuator pressure input 184 to pressurize internal cylinder 276 of barrel 174 of linear actuator 120 and application of pneumatic pressure to piston 176 to control operation of linear actuator 120, such as to move valve 144 relative to valve body 140 to control the flow of extrudable substance 102 from valve body 140 to nozzle 118. In some examples, each one of first actuator pressure input 182 and/or second actuator pressure input 184 is a pneumatic fitting.

Selective pneumatic operation of first actuator pressure input 182 and second actuator pressure input 184 of linear actuator 120 enables precise application of pneumatic pressure to piston 176 to precisely control the flow of extrudable substance 102 out of valve body 140 and into nozzle 118. Additionally, selective pneumatic operation of first actuator pressure input 182 and second actuator pressure input 184 enables the use of automated pneumatic controls to control the pneumatic operation of linear actuator 120.

In some examples, controller 208 includes at least one control valve that is pneumatically coupled to pressure source 218 and linear actuator 120. Controller 208 is configured to control application of pneumatic pressure from pressure source 218 to at least one of first actuator pressure input 182 and second actuator pressure input 184 of linear actuator 120 to drive movement of piston 176. In some examples, the control valve is a two-way valve. In an example, the control valve is an electromechanically operated solenoid valve.

In some examples, pressure source 218 also enables pneumatic control of the delivery mechanism of extrudable substance 102. In an example, the delivery mechanism of extrudable substance 102 includes a pneumatic plunger, operatively coupled with cartridge 116 to urge extrudable substance 102 from cartridge 116 to valve body 140 of valve assembly 112 in response to application of pneumatic pressure. In some examples, controller 208 includes at least one control valve that is pneumatically coupled to pressure source 218 and the delivery mechanism of extrudable substance 102. Controller 208 is configured to control application of pneumatic pressure to urge extrudable substance 102 from cartridge 116 to valve body 140.

Referring generally to FIGS. 1A and 1B and particularly to, e.g., FIGS. 4, 10, and 11, apparatus 100 further comprises first position sensor 186, configured to detect when piston 176 is in the extended position, and second position sensor 188, configured to detect when piston 176 is in the retracted position. Apparatus also comprises positioning element 190, coupled to piston 176. Positioning element 190 is configured to actuate first position sensor 186 when piston 176 is in the extended position and is configured to actuate second position sensor 188 when piston 176 is in the retracted position. The preceding subject matter of this paragraph characterizes example 12 of the present disclosure, wherein example 12 also includes the subject matter according to any one of examples 9 to 11, above.

First position sensor 186 and second position sensor 188 enable detection of whether valve 144 is in the open position or the closed position based on the position of piston 176 relative to barrel 174. Positioning element 190 enables actuation of first position sensor 186 when piston 176 is in the extended position to indicate valve 144 is in the open position. Positioning element 190 also enables actuation of second position sensor 188 when piston 176 is in the retracted position to indicate valve 144 is in the closed position.

Referring generally to FIGS. 1A and 1B, positioning element 190 comprises magnet 192. First position sensor 186 comprises first magnetic sensor 194, proximate one end of barrel 174, and second position sensor 188 comprises second magnetic sensor 196, proximate the other end of barrel 174. The preceding subject matter of this paragraph characterizes example 13 of the present disclosure, wherein example 13 also includes the subject matter according to example 12, above.

Magnet 192 enables non-contact actuation of first magnetic sensor 194 and second magnetic sensor 196 in response to movement of piston 176 relative to barrel 174 between the extended position and the retracted position.

Referring generally to FIGS. 1A and 1B and particularly to, e.g., FIGS. 5, 10, and 11, actuator rod 178 of linear actuator 120 further comprises rod passage 220, extending at least partially through an interior of actuator rod 178. Temperature sensor 204 extends through rod passage 220 into valve chamber 162. The preceding subject matter of this paragraph characterizes example 14 of the present disclosure, wherein example 14 also includes the subject matter according to example 13, above.

Rod passage 220 enables temperature sensor 204 to pass from valve chamber 162, through actuator rod 178, and exit from an end of linear actuator 120, for example, for electrical connection of temperature sensor 204 with controller 208.

In some examples, rod passage 220 extends through actuator rod 178 from proximate to valve 144 to the end of actuator rod 178, opposite valve 144. In some examples, temperature sensor 204 is coupled to an exterior of actuator rod 178, proximate to valve 144, to be in communication with extrudable substance 102, located within valve chamber 162 of valve body 140. In some examples, temperature sensor 204 includes control lines (e.g., communication cables or wires) that are electrically coupled with controller 208. In some examples, the control lines extend through an opening in actuator rod 178 and pass through rod passage 220 of actuator rod 178. In some examples, the control lines and a portion of temperature sensor 204 are located within rod passage 220 and another portion of temperature sensor 204 exits through the opening, formed in actuator rod 178, to be in communication with extrudable substance 102, located within valve chamber 162. In some examples, rod passage 220 extends through first rod body 270, through coupling 272, and through second rod body 274, including through plug 180. In these examples, easy and simple routing of temperature sensor 204 through actuator rod 178 is possible since actuator rod 178 is a multi-component assembly.

Referring generally to FIGS. 1A and 1B and particularly to, e.g., FIGS. 10 and 11, piston 176 comprises first annular piston portion 198, coupled to actuator rod 178, and second annular piston portion 200, coupled to actuator rod 178 and spaced away from first annular piston portion 198. Magnet 192 is an annular magnet, coupled to actuator rod 178 between first annular piston portion 198 and second annular piston portion 200. The preceding subject matter of this paragraph characterizes example 15 of the present disclosure, wherein example 15 also includes the subject matter according to example 14, above.

Positioning of first magnetic sensor 194 and second magnetic sensor 196 at any location around an exterior of barrel 174 relative to piston 176 is possible since magnet 192 is annular. First annular piston portion 198, second annular piston portion 200, and magnet 192 enable actuator rod 178 to extend through piston 176 such that temperature sensor 204 can pass through actuator rod 178 and exit linear actuator 120.

Referring generally to FIGS. 1A and 1B and particularly to, e.g., FIGS. 4, 5, and 8, valve assembly 112 further comprises coupling member 146, coupled to tubular sleeve 108 and rotatable relative to bracket 104 together with tubular sleeve 108. Valve body 140 is coupled to coupling member 146. Linear actuator 120 is coupled to coupling member 146 opposite valve body 140. The preceding subject matter of this paragraph characterizes example 16 of the present disclosure, wherein example 16 also includes the subject matter according to any one of examples 4 to 15, above.

Coupling member 146 enables valve body 140 to be simply, easily, and effectively coupled to and/or decoupled from tubular sleeve 108 within opening 142 such that valve body 140 is co-rotatable with tubular sleeve 108. Coupling member 146 also enables linear actuator 120 to be simply, easily, and effectively coupled to and/or decoupled from valve body 140 with actuator rod 178 extending into valve chamber 162 such that linear actuator 120 can control the position of valve 144 relative to valve body 140. Coupling member 146 also restricts linear movement of valve body 140 along central axis 110 of bracket 104.

Referring generally to FIGS. 1A and 1B and particularly to, e.g., FIGS. 5, 10, and 11, coupling member 146 comprises coupling-member passage 222, coaxially aligned with valve passage 164. The preceding subject matter of this paragraph characterizes example 17 of the present disclosure, wherein example 17 also includes the subject matter according to example 16, above.

Coupling-member passage 222 enables actuator rod 178 to pass through coupling member 146 and into valve body 140 when linear actuator 120 is coupled to coupling member 146. In some examples, coupling-member passage 222 is coaxially aligned with valve passage 164 and opens into valve passage 164 when valve body 140 is coupled to coupling member 146.

Referring generally to FIGS. 1A and 1B and particularly to, e.g., FIG. 4, coupling member 146 comprises first locking interface 252, configured to releasably lock valve body 140 to coupling member 146, and second locking interface 254, configured to releasably lock barrel 174 of linear actuator 120 to coupling member 146. The preceding subject matter of this paragraph characterizes example 18 of the present disclosure, wherein example 18 also includes the subject matter according to example 16 or 17, above.

First locking interface 252 enables valve body 140 to be simply, easily, and effectively coupled to and/or decoupled from coupling member 146. Second locking interface 254 enables linear actuator 120 to be simply, easily, and effectively coupled to and/or decoupled from coupling member 146.

In some examples, valve body 140 also includes third locking interface 278, configured to interlock with first locking interface 252 of coupling member 146. In some examples, first locking interface 252 and third locking interface 278 are cooperating portions of a snap-lock interface. In an example, first locking interface 252 includes at least one tab 280 and third locking interface 278 includes at least one slot 282 that is geometrically complementary to tab 280 and that is configured to receive and retain tab 280 upon insertion of coupling member 146 into valve body 140. In some examples, one or more snap rings (e.g., first snap rings 332) are circumferentially coupled to coupling member 146 and valve body 140 to retain tab 280 and slot 282 in an interlocked position. In some other examples, other types of couplings and/or fasteners are used to couple valve body 140 to coupling member 146.

In some examples, linear actuator 120 also includes fourth locking interface 286, configured to interlock with second locking interface 254 of coupling member 146. In some examples, second locking interface 254 and fourth locking interface 286 are cooperating portions of a twist-lock interface. In an example, fourth locking interface 286 includes at least one twist-lock retainer 288 and second locking interface 254 includes at least one twist-lock clamp 290. In some examples, twist-lock clamp 290 is geometrically (e.g., cross-sectionally) complementary to twist-lock retainer 288 and is configured to receive and retain twist-lock retainer 288 upon insertion of twist-lock retainer 288 into twist-lock clamp 290 and a twisting action of linear actuator 120 relative to coupling member 146. In an example, twist-lock retainer 288 includes a shaft, projecting outward from barrel 174 of linear actuator 120, and a disk-like head, located at an end of the shaft. In an example, twist-lock retainer 288 is a shoulder bolt, coupled to barrel 174 of linear actuator 120. In some other examples, other types of couplings and/or fasteners are used to couple linear actuator 120 to coupling member 146.

Referring generally to FIGS. 1A and 1B and particularly to, e.g., FIGS. 5-7 and 9, apparatus 100 further comprises first drive assembly 150, configured to selectively controllably rotate tubular sleeve 108 about central axis 110 relative to bracket 104. The preceding subject matter of this paragraph characterizes example 19 of the present disclosure, wherein example 19 also includes the subject matter according to any one of examples 1 to 18, above.

First drive assembly 150 enables automated, precise rotation of tubular sleeve 108 about central axis 110 relative to bracket 104. Controlled selective rotary motion of tubular sleeve 108 relative to bracket 104 selectively adjusts rotational orientation of tubular sleeve 108 about central axis 110 relative to bracket 104 and selective adjustment of angular orientation of nozzle 118 relative to bracket 104 and relative to surface 126. Selective adjustability of the angular orientation of nozzle 118 relative to bracket 104 positions nozzle outlet 134 in any one of numerous positions about central axis 110 relative to bracket 104 and surface 126. Angular adjustment of nozzle 118 relative to surface 126 enables deposition of extrudable substance 102 onto various areas of surface 126 without having to change the position of apparatus 100, for example, via robot 106.

Referring generally to FIGS. 1A and 1B and particularly to, e.g., FIGS. 5-7 and 9, first drive assembly 150 comprises first motor 152 and first power-transmitting component 154, operatively coupled with first motor 152 and with tubular sleeve 108. The preceding subject matter of this paragraph characterizes example 20 of the present disclosure, wherein example 20 also includes the subject matter according to example 19, above.

First motor 152 being operatively coupled with first power-transmitting component 154 and tubular sleeve 108 being operatively coupleable with first power-transmitting component 154 enables first motor 526 to controllably selectively rotate tubular sleeve 108 about central axis 110 relative to bracket 104. Controlled selective rotation of first power-transmitting component 154 by first motor 152 enables tracking of the rotational position of tubular sleeve 108 relative to bracket 104 and, thus, tracking of the angular orientation of nozzle 118.

In some examples, first motor 152 includes an output shaft that is rotatable by first motor 152 to produce a rotary force or torque when first motor 152 is operated. In some examples, first motor 152 is any one of various rotational motors, such as an electric motor, a hydraulic motor, a pneumatic motor, an electromagnetic motor, and the like.

First power-transmitting component 154 provides an efficient and reliable mechanism to transmit power from first motor 152 to tubular sleeve 108, such as when central axis 110 is not co-axial with second axis 292 (e.g., an axis of rotation of first motor 152). In an example, first power-transmitting component 154 is a belt, operatively coupled with the output shaft of first motor 152. In other examples, first power-transmitting component 154 is any one of a chain, a gear, a gear train, and the like. Advantageously, the belt is lighter and cleaner than other implementations of first power-transmitting component 154; for example, the belt does not require lubrication for effective operation. In some example, bracket 104 includes a bracket wall, at least partially circumferentially surrounding tubular sleeve 108. In some examples, bracket 104 also includes a bracket opening, defined through the bracket wall. In some examples, the bracket opening provides access to tubular sleeve 108 for first power-transmitting component 154, which passes through the bracket opening.

In some examples, first drive assembly 150 also includes one or more other transmission components, configured to operatively couple first motor 152 with first power-transmitting component 154, including, but not limited to, gears, belts, sprockets, and the like.

Referring generally to FIGS. 1A and 1B and particularly to, e.g., FIGS. 5-7 and 9, tubular sleeve 108 further comprises splines 158, projecting outwardly from tubular sleeve 108, and first power-transmitting component 154 comprises teeth 156, configured to mate with splines 158 of tubular sleeve 108. The preceding subject matter of this paragraph characterizes example 21 of the present disclosure, wherein example 21 also includes the subject matter according to example 20, above.

Teeth 156 of first power-transmitting component 154 and splines 158 of tubular sleeve 108 enable mating engagement of and an interference fit between first power-transmitting component 154 and tubular sleeve 108. Mating engagement of teeth 156 of first power-transmitting component 154 with splines 158 of tubular sleeve 108 enables co-rotation of first power-transmitting component 154 and tubular sleeve 108.

In some examples, splines 158 of tubular sleeve 108 project radially outwardly from and are located circumferentially around an exterior of tubular sleeve 108. In an example, with tubular sleeve 108 coupled to bracket 104, splines 158 are oriented parallel with central axis 110. In an example, splines 158 generally extend from one end of tubular sleeve 108 to the other end of tubular sleeve 108. In another example, splines 158 extend between annular bearings 256, coupled to tubular sleeve 108. In another example, splines 158 are located on only a circumferential portion of tubular sleeve 108 that is engaged by first power-transmitting component 154. Throughout the present disclosure, the term parallel refers to an orientation between items extending in approximately the same direction.

Referring generally to FIGS. 1A and 1B and particularly to, e.g., FIGS. 5-7 and 9, bracket 104 comprises tensioner 160, configured to tension first power-transmitting component 154 with respect to first motor 152 and tubular sleeve 108. The preceding subject matter of this paragraph characterizes example 22 of the present disclosure, wherein example 22 also includes the subject matter according to example 20 or 21, above.

Tensioner 160 applies adjustable tension to first power-transmitting component 154. With tensioner 160 engaged with and applying tension to first power-transmitting component 154, first power-transmitting component 154 maintains contact with a portion of tubular sleeve 108 so that teeth 156 of first power-transmitting component 154 remain mated with splines 158 of tubular sleeve 108.

In some examples, tensioner 160 includes a tensioner base, coupled to bracket 104, and a tensioner pulley, coupled to the tensioner base and rotatable relative to the tensioner base about an axis, parallel to central axis 110. In these examples, the tensioner pulley is configured to engage first power-transmitting component 154. In some examples, tensioner 160 is linearly moveable relative to bracket 104. Linear movement of tensioner 160 enables positional adjustment of tensioner 160 relative to bracket 104 and adjustment of tension, applied to first power-transmitting component 154 by tensioner 160. In some examples, tensioner 160 also includes a tensioner-biasing element, configured to bias the tensioner pulley against first power-transmitting component 154. In some examples, tensioner 160 is not rotatable relative to bracket 104. Fixing rotational orientation of tensioner 160 relative to bracket 104 fixes the position of the tensioner pulley parallel to central axis 110 and enables tensioner 160 to maintain positive contact with first power-transmitting component 154.

Referring generally to FIGS. 1A and 1B and particularly to, e.g., FIGS. 4, 8, and 9, tubular sleeve 108 further comprises first interlock 224. Valve body 140 comprises second interlock 226, geometrically complementary with first interlock 224. First interlock 224 is configured to engage second interlock 226 to prevent rotation of valve body 140 about central axis 110 relative to tubular sleeve 108. The preceding subject matter of this paragraph characterizes example 23 of the present disclosure, wherein example 23 also includes the subject matter according to any one of examples 19 to 22, above.

Mating engagement of first interlock 224 and second interlock 226 fixes rotational orientation of valve body 140 relative to tubular sleeve 108 and prevents rotation of valve body 140 about central axis 110 relative to tubular sleeve 108.

In some examples, first interlock 224 of tubular sleeve 108 includes groove 294 and second interlock 226 of valve body 140 includes protrusion 298. Alignment and engage of protrusion 298 with groove 294 fixes the rotational orientation of valve body 140 relative to tubular sleeve 108. In some examples, groove 294 of first interlock 224 is located on and depends inwardly from peripheral wall 296 of tubular sleeve 108 (FIG. 9). In some examples, protrusion 298 of second interlock 226 of valve body 140 is located on and projects outwardly from an exterior surface of valve body 140 (FIG. 4). In some examples, groove 294 extends from one edge of peripheral wall 296 toward the other edge of peripheral wall 296. Protrusion 298 is slidingly received by groove 294 when valve body 140 is positioned (e.g., inserted) within opening 142 and circumferentially surrounded by peripheral wall 296 of tubular sleeve 108. In an example, groove 294 includes open end 300, located at the one edge of peripheral wall 296, and closed end 302, opposite open end 300. Open end 300 enables insertion of protrusion 298 within groove 294. Closed end 302 limits linear movement of valve body 140 relative to tubular sleeve 108 when protrusion 298 is completely received by groove 294, for example, when an end of protrusion 298 contacts closed end 302 of groove 294. While not explicitly illustrated, in some other examples, first interlock 224 of tubular sleeve 108 includes protrusion 298, located on and projecting outwardly from peripheral wall 296 of tubular sleeve 108, and second interlock 226 of valve body 140 includes groove 294, located on and depending inwardly from exterior surface of valve body 140. In some examples, first interlock 224 of tubular sleeve 108 includes more than one groove 294 and second interlock 226 of valve body 140 includes more than one protrusion 298.

Referring generally to FIGS. 1A and 1B and particularly to, e.g., FIG. 2, bracket 104 is configured to be removably coupled to robot 106 so that bracket 104 is linearly moveable along central axis 110 relative to robot 106. The preceding subject matter of this paragraph characterizes example 24 of the present disclosure, wherein example 24 also includes the subject matter according to any one of examples 19 to 23, above.

Linear movement of bracket 104 relative to robot 106 enables linear movement of nozzle 118 relative to robot 106 and to surface 126. Linear movement of nozzle 118 relative to surface 126 enables nozzle 118 to dispense extrudable substance 102 on surface 126 that has an irregular shape or on multiple other surfaces of the workpiece, for example, without having to change the position of apparatus 100 via robot 106.

Referring generally to FIGS. 1A and 1B and particularly to, e.g., FIG. 2-7, apparatus 100 further comprises robot interface 228, configured to be coupled to robot 106, and interface bracket 230, configured to be coupled to robot interface 228 and linearly moveable relative to robot interface 228. Bracket 104 is coupled to interface bracket 230. The preceding subject matter of this paragraph characterizes example 25 of the present disclosure, wherein example 25 also includes the subject matter according to example 24, above.

Linear movement of interface bracket 230 relative to robot interface 228 enables linear movement of bracket 104 relative to robot 106. Robot interface 228 enables quick coupling of apparatus 100 with robot 106 and quick releasing of apparatus 100 from robot 106. Interface bracket 230 movably couples bracket 104 to robot interface 228.

In some examples, robot interface 228 provides quick coupling of communication lines between apparatus 100 and robot 106. In some examples, robot interface 228 enables automated coupling of apparatus 100 with robot 106 and automated releasing of apparatus 100 from robot 106. In some examples, robot interface 228 is a tool-side portion of a pneumatic quick-change mechanism and robot 106 includes a tool interface of the pneumatic quick-change mechanism.

In some examples, interface bracket 230 includes a pair of bracket arms 304. Bracket arms 304 of interface bracket 230 engage robot interface 228 to coupled interface bracket 230 with robot interface 228 and guide linear motion of interface bracket 230 relative to robot interface 228. In some examples, each one of bracket arms 304 includes a guide channel and robot interface 228 includes a pair of guide rails. Each guide channels of bracket arms 304 is configured to receive and move along an associated one of the guide rails.

Referring generally to FIGS. 1A and 1B and particularly to, e.g., FIG. 5, apparatus 100 further comprises proximity sensor 232, coupled to interface bracket 230 and configured to detect when tubular sleeve 108 is in predetermined rotational orientation relative to bracket 104. Apparatus 100 also comprises homing element 234, coupled to tubular sleeve 108 and configured to actuate proximity sensor 232 when tubular sleeve 108 is rotated about central axis 110 to predetermined rotational orientation. The preceding subject matter of this paragraph characterizes example 26 of the present disclosure, wherein example 26 also includes the subject matter according to example 25, above.

Homing element 234 enables actuation of proximity sensor 232 when tubular sleeve 108 is rotated to a predetermined rotational orientation relative to bracket 104, for example, to indicate that tubular sleeve 108 is in a home position. Use of homing element 234 and proximity sensor 232 to indicate the home position also enables use of an incremental position encoder, which is capable of determining the rotational orientation of tubular sleeve 108 relative to bracket 104 following a power interruption. One the other hand, an absolute position encoder would be unable to determine the rotational orientation of tubular sleeve 108 relative to bracket 104 in case of a power interruption.

Referring generally to FIGS. 1A and 1B, homing element 234 comprises magnet 236, coupled to tubular sleeve 108. Proximity sensor 232 is a magnetic sensor. The preceding subject matter of this paragraph characterizes example 27 of the present disclosure, wherein example 27 also includes the subject matter according to example 26, above.

Magnet 236 enables non-contact actuation of magnetic sensor 238 when tubular sleeve 108 is rotated to the predetermined rotational orientation relative to bracket 104 to indicate that tubular sleeve 108 is in the home position.

Referring generally to FIGS. 1A and 1B, interface bracket 230 is selectively linearly movable along central axis 110 relative to robot interface 228. The preceding subject matter of this paragraph characterizes example 28 of the present disclosure, wherein example 28 also includes the subject matter according to any one of examples 25 to 27, above.

Selective linear movement of interface bracket 230 along central axis 110 relative to robot interface 228 enables controlled, selective adjustment of the linear position of bracket 104 relative to robot 106 and controlled, selective adjustment of the linear position of nozzle 118 relative to surface 126. Controlled, selective linear movement of nozzle 118 relative to surface 126 enables nozzle 118 to deposit extrudable substance 102 on surface 126 that has an irregular shape or on multiple other surfaces of the workpiece.

In some examples, apparatus 100 also includes a second drive assembly, configured to selectively controllably translate interface bracket 230 along central axis 110 relative to robot interface 228. The second drive assembly enables automated, precise linear translation of interface bracket 230 along central axis 110 relative to robot interface 228. Controlled selective linear movement of interface bracket 230 relative to robot interface 228 controls selective adjustment of linear position of bracket 104 along central axis 110, relative to robot interface 228, and also controls selective adjustment of linear position of nozzle 118 relative to surface 126. In some examples, the second drive assembly includes a second motor and a second power-transmitting component, operatively coupled with the second motor and interface bracket 230. The second motor is able to controllably translate interface bracket 230 relative to robot interface 228 since the second motor is operatively coupled with the second power-transmitting component and interface bracket 230 is operatively coupled with the second power-transmitting component enables. The second power-transmitting component enables selective linear movement of interface bracket 230 along an axis, parallel to central axis 110 relative to robot interface 228. With the second power-transmitting component operatively coupled with interface bracket 230, operation of the second power-transmitting component enables selective linear movement of interface bracket 230 relative to robot interface 228. Additionally, controlled selective translation of interface bracket 230 relative to robot interface 228 enables automated linear tracking of interface bracket 230 relative to robot interface 228.

In some examples, the second motor includes an output shaft that is rotatable by the second motor to produce a rotary force or torque when the second motor is operated. In some examples, the second motor is any one of various rotational motors, such as an electric motor, a hydraulic motor, a pneumatic motor, an electromagnetic motor, and the like. In some examples, the second motor is coupled to robot interface 228. The second power-transmitting component provides an efficient and reliable mechanism to transmit power from the second motor to interface bracket 230. In some examples, the second power-transmitting component is any one of a translation screw drive, a chain, a belt, a gear, a gear train, and the like. In some examples, the second drive assembly also includes one or more other transmission components, configured to operatively couple the second motor with second power-transmitting component, including, but not limited to, gears, belts, sprockets, and the like.

Referring generally to FIGS. 1A and 1B and particularly to, e.g., FIGS. 2, 3, and 12-15, system 128 for depositing extrudable substance 102 onto surface 126 is disclosed. System 128 comprises cartridge 116, configured to contain extrudable substance 102, and flow-bypass assembly 114, communicatively coupled with cartridge 116 and configured to selectively purge air from extrudable substance 102. System 128 further comprises delivery tube 130, comprising first delivery-tube end 136, communicatively coupled with flow-bypass assembly 114. Delivery tube 130 additionally comprises second delivery-tube end 138, in communication with first delivery-tube end 136. System 128 also comprises valve assembly 112, communicatively coupled with second delivery-tube end 138 and nozzle 118, communicatively coupled with valve assembly 112. The preceding subject matter of this paragraph characterizes example 29 of the present disclosure.

System 128 provides for depositing extrudable substance 102, though nozzle 118, to surface 126 of a workpiece located, for example, in a confined space. Flow-bypass assembly 114 enables selective flow control of extrudable substance 102 to delivery tube 130. Flow-bypass assembly 114 further enables purging of air from extrudable substance 102 prior to extrudable substance 102 entering delivery tube 130. Purging air prior to entry into delivery tube 130 eliminates wasting a portion of extrudable substance 102 resulting from passing air through delivery tube 130 and out off valve assembly 112, for example, during replacement of cartridge 116 and/or a purging operation.

System 128 is configured to reduce the labor, time, and inaccuracies associated with the application of extrudable substance 102 onto surface 126 (and/or other surfaces) of the workpiece or other structures. Apparatus 100 is further configured to automate application of extrudable substance 102 within a confined space, such as within a wing box of an aircraft.

Generally, system 128 functions as an automated end effector that is operably coupled with an end of robot 106 (FIG. 2) or other robotic arm mechanism and that is designed to interact with the environment by depositing extrudable substance 102 onto surface 126. Cartridge 116 of system 128 provides for containment of extrudable substance 102. Flow-bypass assembly 114 selectively controls flow of extrudable substance 102 from cartridge 116 to delivery tube 130. Delivery tube 130 dispenses extrudable substance 102 to valve assembly 112. Flow-bypass assembly 114 also selectively purges air from extrudable substance 102 before extrudable substance 102 enters delivery tube 130. Nozzle 118 is sealed to valve assembly 112 to direct the flow of extrudable substance 102 from valve assembly 112 to surface 126.

In some examples, a delivery mechanism is operatively coupled with cartridge 116 to control flow of extrudable substance 102 out of cartridge 116 and into flow-bypass assembly 114. In an example, the delivery mechanism includes a plunger, operatively coupled with cartridge 116 to drive or urge extrudable substance 102 from cartridge 116 to valve assembly 112 via delivery tube 130. In some examples, actuation of the plunger is controlled in any one of various ways, including, but not limited to, application of pneumatic pressure, application of hydraulic pressure, application of a mechanical force, and the like.

Referring generally to FIGS. 1A and 1B and particularly to, e.g., FIGS. 12-15, flow-bypass assembly 114 comprises flow-bypass inlet port 240, configured to be communicatively coupled with cartridge 116. Flow-bypass assembly 114 also comprises flow-bypass dispensing port 242, selectively communicatively coupled with flow-bypass inlet port 240, and flow-bypass purging port 244, selectively communicatively coupled with flow-bypass inlet port 240. First delivery-tube end 136 of delivery tube 130 is communicatively coupled with flow-bypass dispensing port 242. The preceding subject matter of this paragraph characterizes example 30 of the present disclosure, wherein example 30 also includes the subject matter according to example 29, above.

Selective, communicative coupling of flow-bypass dispensing port 242 with flow-bypass inlet port 240 enables extrudable substance 102 to flow from cartridge 116 to valve assembly 112 via delivery tube 130. Selective, communicative coupling of flow-bypass purging port 244 with flow-bypass inlet port 240 enables air to be purged from extrudable substance 102 before extrudable substance 102 enters delivery tube 130.

In some examples, flow-bypass dispensing port 242 and flow-bypass purging port 244 are located on opposite sides of flow-bypass assembly 114. In some examples, flow-bypass assembly 114 includes a fitting, configured to enable first delivery-tube end 136 of delivery tube 130 to be sealingly coupled with flow-bypass dispensing port 242 of flow-bypass assembly 114. In some examples, flow-bypass assembly 114 includes another fitting, configured to enable a waste tube to be sealingly coupled with flow-bypass purging port 244 of flow-bypass assembly 114. In these examples, the purged air and any wasted portion of extrudable substance 102 exiting flow-bypass assembly 114 passes through the waste tube and is discarded. In other examples, flow-bypass purging port 244 of flow-bypass assembly 114 is open such that the purged air simply exits flow-bypass assembly 114.

In some examples, flow-bypass assembly 114 also includes cartridge interface 306. Cartridge interface 306 is configured to be sealingly engaged with an outlet port (not shown) of cartridge 116 such that flow-bypass inlet port 240 of flow-bypass assembly 114 is in fluid communication with cartridge 116. In some examples, at least one of the outlet port of cartridge 116 and/or cartridge interface 306 includes a gasket, configured to form a seal between cartridge 116 and flow-bypass assembly 114. In some examples, the gasket is an O-ring, made of a pliable or compressible material, such as rubber silicone, and plastic polymers.

Referring generally to FIGS. 1A and 1B and particularly to, e.g., FIGS. 12-15, flow-bypass assembly 114 comprises ball valve 246, comprising flow channel 248. Flow-bypass assembly 114 further comprises actuator 250, configured to rotate ball valve 246 such that flow channel 248 communicatively couples flow-bypass dispensing port 242 with flow-bypass inlet port 240 or flow channel 248 communicatively couples flow-bypass purging port 244 with flow-bypass inlet port 240. The preceding subject matter of this paragraph characterizes example 31 of the present disclosure, wherein example 31 also includes the subject matter according to example 30, above.

Ball valve 246 enables controllable selection between delivery of extrudable substance 102 to flow-bypass dispensing port 242 or purging of air from flow-bypass purging port 244. Actuator 250 controls rotational orientation of ball valve 246 about third axis 326 (e.g., an axis of rotation of ball valve 246) and, thus, angular orientation of flow channel 248 relative to flow-bypass inlet port 240, flow-bypass dispensing port 242, and flow-bypass purging port 244. Rotation of ball valve 246 selectively aligns flow channel 248 in communication with one of flow-bypass inlet port 240 and flow-bypass dispensing port 242 or flow-bypass inlet port 240 and flow-bypass purging port 244.

In some examples, flow-bypass assembly 114 includes assembly housing 324. Ball valve 246 is positioned within and is rotatable about third axis 326 relative to assembly housing 324. In some examples, flow-bypass assembly 114 includes flow-bypass inlet passage 308 formed through assembly housing 324 in communication with flow-bypass inlet port 240. In some examples, flow-bypass assembly 114 includes flow-bypass dispensing passage 310 formed through assembly housing 324 in communication with flow-bypass dispensing port 242. In some examples, flow-bypass assembly 114 includes flow-bypass purging passage 312 formed through assembly housing 324 in communication with flow-bypass purging port 244.

Flow channel 248 is formed through a ball member of ball valve 246. In some examples, flow channel 248 of ball valve 246 includes first flow-channel portion 328 formed through the ball member of ball valve 246 and second flow-channel portion 330, formed through the ball member of ball valve 246. Rotation of ball valve 246 into a first rotational orientation (e.g., dispensing orientation) aligns first flow-channel portion 328 with flow-bypass inlet passage 308 and aligns second flow-channel portion 330 with flow-bypass dispensing passage 310 to enable flow of extrudable substance 102 from flow-bypass dispensing port 242 (FIG. 14). Rotation of ball valve 246 into a second rotational orientation (e.g., purging orientation) aligns second flow-channel portion 330 with flow-bypass inlet passage 308 and aligns first flow-channel portion 328 with flow-bypass purging passage 313 to purge air and, optionally, extrudable substance 102, from flow-bypass purging port 244 (FIG. 15).

In an example, flow-bypass dispensing passage 310 and flow-bypass purging passage 312 are positioned approximately parallel with each other and flow-bypass inlet passage 308 is positioned approximately perpendicular to flow-bypass dispensing passage 310 and flow-bypass purging passage 312. In this example, first flow-channel portion 328 and second flow-channel portion 330 are positioned approximately perpendicular to each other.

In some examples, flow-bypass inlet passage 308 includes flow-bypass inlet orifice 314 that enables flow of extrudable substance 102 from flow-bypass inlet port 240 into flow channel 248. In some examples, flow-bypass dispensing passage 310 includes flow-bypass dispensing orifice 316 that enables flow of extrudable substance 102 from flow channel 248 to flow-bypass dispensing port 242. In some examples, flow-bypass purging passage 312 includes flow-bypass purging orifice 318 that enables flow of extrudable substance 102 from flow channel 248 to flow-bypass purging port 244. In some examples, first flow-channel portion 328 includes first flow channel orifice 320 and second flow-channel portion 330 includes second flow channel orifice 322. Rotation of ball valve 246 into the first rotational orientation sealingly engages first flow channel orifice 320 with flow-bypass inlet orifice 314 and sealingly engages second flow channel orifice 322 with flow-bypass dispensing orifice 316 (FIG. 14). Rotation of ball valve 246 into the second rotational orientation sealingly engages first flow channel orifice 320 with flow-bypass purging orifice 318 and sealingly engages second flow channel orifice 322 with flow-bypass inlet orifice 314 (FIG. 15).

In some examples, actuator 250 includes any one of various types of actuation mechanisms, such as a manual actuator, an electromechanical actuator, a pneumatic actuator, and a hydraulic actuator, that is operatively coupled to ball valve 246 to selectively rotate ball valve 246 about third axis 326.

Referring generally to FIGS. 1A and 1B and particularly to, e.g., FIGS. 4, 5, 8, 10, and 11, valve assembly 112 comprises valve body 140, configured to be communicatively coupled with second delivery-tube end 138, and valve 144, internal to valve body 140. Valve assembly 112 further comprises linear actuator 120, configured to position valve 144 relative to valve body 140. Nozzle 118 is configured to be communicatively coupled with valve body 140. The preceding subject matter of this paragraph characterizes example 32 of the present disclosure, wherein example 32 also includes the subject matter according to any one of examples 29 to 31, above.

The configuration of tubular sleeve 108 and valve assembly 112 of apparatus 100 substantially reduces the size of apparatus 100. Nozzle 118 is sealed to valve body 140 of valve assembly 112 to direct flow of extrudable substance 102 from valve body 140 to surface 126. Linear actuator 120 of valve assembly 112 controls flow of extrudable substance 102 from valve body 140 to nozzle 118 by selectively opening and closing valve 144 of valve assembly 112. In some examples, linear actuator 120 is any one of various linear actuators powered in any one of various ways, such as pneumatically, electrically, hydraulically, and the like.

Referring generally to FIGS. 1A and 1B and particularly to, e.g., FIGS. 5, 6, and 9, system 128 further comprises bracket 104, comprising opening 142 that has central axis 110, and tubular sleeve 108, coupled to bracket 104 via opening 142 and rotatable relative to bracket 104 about central axis 110. Valve body 140 is fixed to tubular sleeve 108 and is rotatable relative to bracket 104 together with tubular sleeve 108. The preceding subject matter of this paragraph characterizes example 33 of the present disclosure, wherein example 33 also includes the subject matter according to example 32, above.

Rotation of tubular sleeve 108 enables control of angular orientation of nozzle 118 relative to bracket 104 and surface 126 during deposition of extrudable substance 102 onto surface 126 at select locations.

In some examples, with tubular sleeve 108 coupled to bracket 104, tubular sleeve 108 circumscribes central axis 110. In some examples, with valve body 140 of valve assembly 112 fixed to tubular sleeve 108, valve body 140 is located within opening 142 and tubular sleeve 108 circumscribes and circumferentially engages at least a portion of valve body 140. In some examples, tubular sleeve 108 and at least a portion of valve body 140 each has a circular cross-sectional shape. In some other examples, tubular sleeve 108 and at least a portion of valve body 140 each has an elliptical cross-sectional shape.

In some examples, tubular sleeve 108 is coupled to bracket 104 in any manner suitable to enable rotation of tubular sleeve 108 about central axis 110 relative to bracket 104. In some examples, apparatus 100 also includes one or more annular bearings 256, coupled to an exterior of tubular sleeve 108. In an example, a first one of annular bearings 256 is located at one end of tubular sleeve 108 and a second one of annular bearings 256 is located at the other end of tubular sleeve 108.

Referring generally to FIGS. 1A and 1B and particularly to, e.g., FIGS. 5, 6, and 9, delivery tube 130 is sufficiently flexible to enable rotation of valve body 140 about central axis 110 relative to bracket 104 together with tubular sleeve 108. The preceding subject matter of this paragraph characterizes example 34 of the present disclosure, wherein example 34 also includes the subject matter according to example 33, above.

Sufficient flexibility of delivery tube 130 enables rotation of valve body 140 about central axis 110 without binding of delivery tube 130.

Referring generally to FIGS. 1A and 1B and particularly to, e.g., FIGS. 4-6, 10, and 11, nozzle 118 comprises nozzle inlet 132, communicatively coupled with valve body 140, and nozzle outlet 134, laterally offset from nozzle inlet 132 relative to central axis 110. The preceding subject matter of this paragraph characterizes example 35 of the present disclosure, wherein example 35 also includes the subject matter according to example 33 or 34, above.

Nozzle outlet 134 being laterally offset from nozzle inlet 132 relative to central axis 110 enables disposition of extrudable substance 102 at a location on surface 126 that is laterally offset relative to valve outlet port 168 and central axis 110. In some examples, nozzle 118 includes nozzle channel 258, extending between nozzle inlet 132 and nozzle outlet 134. Controllably adjusting angular orientation of nozzle 118 about central axis 110 relative to bracket 104, in response to rotation of nozzle 118 together with valve assembly 112, controllably positions nozzle outlet 134 relative to surface 126.

Referring generally to FIGS. 1A and 1B and particularly to, e.g., FIGS. 10 and 11, valve body 140 comprises valve chamber 162, valve inlet port 166, communicatively coupled with valve chamber 162, and valve outlet port 168, coaxial with valve chamber 162 and communicatively coupled with valve chamber 162. Valve body 140 further comprises valve seat 172, located between valve chamber 162 and valve outlet port 168. Valve body 140 also comprises valve passage 164, coaxial with valve chamber 162 and located opposite valve outlet port 168. Valve inlet port 166 is configured to be communicatively coupled with cartridge 116. Valve outlet port 168 is configured to be communicative coupled to nozzle 118. Valve passage 164 is communicatively coupled with valve chamber 162. The preceding subject matter of this paragraph characterizes example 36 of the present disclosure, wherein example 36 also includes the subject matter according to any one of examples 33 to 35, above.

Valve inlet port 166, valve chamber 162 and valve outlet port 168 define a flow path for extrudable substance through valve body 140 of valve assembly 112. Valve inlet port 166 sealing engages with cartridge 116, containing extrudable substance 102. Valve outlet port 168 sealing engages with nozzle 118. Valve seat 172 provides a sealable interface between valve chamber 162 and valve outlet port 168. Selective sealing engagement of valve seat 172 by valve 144 segregates valve chamber 162 and valve outlet port 168 and blocking the flow path of extrudable substance 102 from valve inlet port 166 to valve outlet port 168 through valve chamber 162. Valve passage 164 provides access to valve seat 172 by linear actuator 120 through valve chamber 162. Access of linear actuator 120 to valve seat 172 controls the flow of extrudable substance 102 through valve body 140 by selectively positioning valve 144 relative to valve seat 172.

In some examples, valve inlet port 166 includes a gasket, configured to form a seal between valve inlet port 166 and cartridge 116. In some examples, nozzle inlet 132 is coaxially aligned with valve outlet port 168. In some examples, valve outlet port 168 includes a gasket, configured to form a seal between valve outlet port 168 and nozzle 118. In some examples, at least one snap ring (e.g., second snap ring 284) is circumferentially coupled to valve body 140 and nozzle 118 to retain nozzle 118, coupled to valve body 140. In some other examples, other types of couplings and/or fasteners are used to couple nozzle 118 to valve body 140.

Referring generally to FIGS. 1A and 1B and particularly to, e.g., FIGS. 10 and 11, linear actuator 120 comprises barrel 174, removably coupled with valve body 140, and piston 176, movable along central axis 110 within barrel 174 between an extended position and a retracted position, spaced away from the extended position. Linear actuator 120 further comprises actuator rod 178, coupled to piston 176 and extending through valve passage 164 into valve chamber 162. Valve 144 is coupled to actuator rod 178. With piston 176 in the extended position, valve 144 is positioned within valve outlet port 168 and does not sealingly engage valve seat 172. With piston 176 in the retracted position, valve 144 sealingly engages valve seat 172. The preceding subject matter of this paragraph characterizes example 37 of the present disclosure, wherein example 37 also includes the subject matter according to example 36, above.

Linear actuator 120 enables precise control of flow rate of extrudable substance 102 out of valve body 140 and into nozzle 118. Linear actuator 120 enables the flow of extrudable substance 102 from valve outlet port 168 by selectively positioning valve 144 in an open position, in which valve 144 is positioned beyond, or at least partially within, valve outlet port 168 and is not sealingly engaged with valve seat 172, when piston 176 is moved into the extended position (FIG. 11). Linear actuator 120 restricts the flow of extrudable substance 102 from valve outlet port 168 by selectively positioning valve 144 in a closed position, in which valve 144 is position at least partially within valve seat 172 and is sealingly engaged with valve seat 172, when piston 176 is moved into the retracted position (FIG. 10).

In some examples, valve 144 includes a plug body that is coupled to an end of actuator rod 178 and is configured to fit within valve seat 172. In some examples, at least a portion of the plug body of valve 144 has a cross-sectional shape matching a cross-sectional shape of valve seat 172 and is sized in close tolerance to valve seat 172, such that a perimeter of valve seat 172 circumferentially seals with at least a portion of the plug body of valve 144 when valve 144 is in the closed position.

Referring generally to FIGS. 1A and 1B and particularly to, e.g., FIGS. 4, 10, and 11, actuator rod 178 comprises plug 180, positioned within valve passage 164. The preceding subject matter of this paragraph characterizes example 38 of the present disclosure, wherein example 38 also includes the subject matter according to example 37, above.

Plug 180 enables restriction of flow of extrudable substance 102 from valve chamber 162 into valve passage 164. In other words, plug 180 being positioned within valve passage 164 prevents backflow of extrudable substance 102 from valve chamber 162 into valve passage 164 as extrudable substance 102 flows through valve body 140 and during actuation of linear actuator 120 (e.g., as actuator rod 178 and plug 180 move relative to valve body 140).

In some examples, actuator rod 178 includes first rod body 270, coupled to piston 176, coupling 272, coupled to first rod body 270, opposite piston 176, and second rod body 274, coupled to coupling 272, opposite first rod body 270. In some examples, plug 180 is coupled to second rod body 274. In some other examples, second rod body 274 forms plug 180. In some examples, valve 144 is coupled to second rod body 274, opposite coupling 272. In some examples, valve 144 is spaced away from plug 180. In some examples, valve 144 includes a valve stem, coupled to second rod body 274. The plug body of valve 144 is coupled to an end of the valve stem of valve 144, opposite second rod body 274.

In some examples, it is possible to construct actuator rod 178 in accordance with the particular application and/or configuration of valve body 140 since actuator rod 178 is multi-sectional (a multi-component assembly). In some examples, coupling 272 is a threaded coupling, configured to be threadably coupled to first rod body 270 and second rod body 274. In some examples, valve 144 is threadably coupled to second rod body 274.

Referring generally to FIGS. 1A and 1B and particularly to, e.g., FIGS. 5, 10, and 11, system 128 further comprises temperature sensor 204, configured to be in communication with extrudable substance 102 within valve chamber 162 of valve body 140 when extrudable substance 102 is introduced within valve chamber 162. The preceding subject matter of this paragraph characterizes example 39 of the present disclosure, wherein example 39 also includes the subject matter according to example 37 or 38, above.

Temperature sensor 204 enables detection of temperature of extrudable substance 102 within valve chamber 162 of valve body 140. In some examples, the temperature of extrudable substance 102 within valve body 140 that is detected by temperature sensor 204 is used to control the rate at which extrudable substance 102 flows from cartridge 116 to valve body 140. Additionally, in some examples, the temperature of extrudable substance 102 within valve body 140 that is detected by temperature sensor 204 is used to control actuation of linear actuator 120 to regulate the rate at which extrudable substance 102 flows from valve body 140 to nozzle 118.

Referring generally to FIGS. 1A and 1B and particularly to, e.g., FIGS. 5, 10, and 11, system 128 further comprises pressure sensor 206, configured to be in communication with extrudable substance 102 within valve chamber 162 of valve body 140 when extrudable substance 102 is introduced within valve chamber 162. The preceding subject matter of this paragraph characterizes example 40 of the present disclosure, wherein example 40 also includes the subject matter according to example 39, above.

Pressure sensor 206 enables detection of pressure of extrudable substance 102 within valve chamber 162 of valve body 140. In some examples, the pressure of extrudable substance 102 within valve body 140 that is detected by pressure sensor 206 is used to control the rate at which extrudable substance 102 flows from cartridge 116 to valve body 140. Additionally, in some examples, the pressure of extrudable substance 102 within valve body 140 that is detected by pressure sensor 206 is used to control actuation of linear actuator 120 to regulate the rate at which extrudable substance 102 flows from valve body 140 to nozzle 118.

In some examples, pressure sensor 206 is configured to be removably coupled to valve body 140. In some examples, valve body 140 includes pressure-sensor port 260. Pressure-sensor port 260 is in communication with valve chamber 162. Pressure sensor 206 is at least partially located within pressure-sensor port 260 such that pressure sensor 206 is in communication with extrudable substance 102 within valve chamber 162 of valve body 140 when extrudable substance 102 is introduced within valve chamber 162.

Referring generally to FIGS. 1A and 1B and particularly to, e.g., FIGS. 4-8, 10, and 11, system 128 further comprises pressure-sensor housing 210, configured to house pressure sensor 206. Pressure-sensor housing 210 is configured to be removably coupled to valve body 140 to position pressure sensor 206 in communication with extrudable substance 102 within valve chamber 162 of valve body 140. The preceding subject matter of this paragraph characterizes example 41 of the present disclosure, wherein example 41 also includes the subject matter according to example 40, above.

Pressure-sensor housing 210 enable simple, easy, and effective coupling of pressure sensor 206 to valve body 140 in communication with extrudable substance 102 within valve chamber 162. Pressure-sensor housing 210 is configured to support and retain pressure sensor 206. Pressure-sensor housing 210 releasably locks pressure sensor 206 to valve body 140 such that pressure sensor 206 is in contact with extrudable substance 102 located within valve chamber 162 of valve body 140.

In some examples, valve body 140 includes a pressure-sensor receptacle that is cross-sectionally complementary to pressure-sensor housing 210 and is configured to receive and retain pressure-sensor housing 210. The pressure-sensor receptacle opens into pressure-sensor port 260 such that pressure sensor 206 extends into valve chamber 162, in communication with extrudable substance 102, when pressure-sensor housing 210 is received by and coupled to the pressure-sensor receptacle.

In some examples, pressure-sensor housing 210 and valve body 140 are couplable via interlocking interface 262 to enable pressure sensor 206 to be easily and securely coupled to valve body 140 in communication with valve chamber 162 and/or easily decoupled from valve body 140. In some examples, interlocking interface 262 is a twist-lock interface. In an example, pressure-sensor housing 210 includes at least one twist-lock retainer 266 and valve body 140 includes at least one twist-lock groove 268, for example, formed in the pressure-sensor receptacle. Upon insertion of pressure-sensor housing 210 into pressure-sensor receptacle, twist-lock groove 268 is configured to receive twist-lock retainer 266. In response to a twisting action (e.g., partial rotation) of pressure-sensor housing 210 relative to valve body 140, twist-lock groove 268 is configured to retain twist-lock retainer 266 to lock pressure-sensor housing 210 and valve body 140 together. In an example, twist-lock retainer 266 includes a shaft, projecting outward from pressure-sensor housing 210, and a disk-like head, located at an end of the shaft. In an example, twist-lock retainer 266 is a shoulder bolt, coupled to pressure-sensor housing 210. In some other examples, interlocking interface 262 is a threaded interface. In some other examples, other types of couplings and/or fasteners are used to couple pressure sensor 206 to valve body 140 with pressure sensor 206 being in communication with valve chamber 162.

Referring generally to FIGS. 1A and 1B, system 128 further comprises controller 208, operatively coupled with at least one of temperature sensor 204 or pressure sensor 206 to control, based on signals, obtained from at least the one of temperature sensor 204 or pressure sensor 340, flow rate of extrudable substance 102 through valve body 140. The preceding subject matter of this paragraph characterizes example 42 of the present disclosure, wherein example 42 also includes the subject matter according to example 40 or 41, above.

Use of at least one of temperature sensor 204 or pressure sensor 206 to control the flow rate of extrudable substance 102 through valve body 140 enables precise and predictable flow of extrudable substance 102.

In some examples, controller 208 includes at least one electronic controller, such as a programmable processor. In some examples, controller 208 is operatively coupled with linear actuator 120 to control actuation of linear actuator 120 to selectively position valve 144 in one of the open position or the closed position to control flow of extrudable substance 102 through valve body 140. In some examples, controller 208 is operatively coupled with the delivery mechanism that urges extrudable substance 102 from cartridge 116 to valve body 140 to control the flow of extrudable substance 102 to valve assembly 112.

Referring generally to FIGS. 1A and 1B, system 128 further comprises temperature-signal conditioner 212, electrically coupled to temperature sensor 204, and pressure-signal conditioner 214, electrically coupled to pressure sensor 206. System 128 also comprises input/output connector 216, communicatively coupling at least one of temperature-signal conditioner 212 or pressure-signal conditioner 214 with controller 208. The preceding subject matter of this paragraph characterizes example 43 of the present disclosure, wherein example 43 also includes the subject matter according to example 42, above.

Temperature-signal conditioner 212 enables communication of temperature-related information from temperature sensor 204 to controller 208 in a format usable by controller 208. Pressure-signal conditioner 214 enables communication of pressure-related information from pressure sensor 206 to controller 208 in a format usable by controller 208. Input/output connector 216 enables electrical communication between controller 208 and at least one of temperature-signal conditioner 212 or pressure-signal conditioner 214. In an example, temperature-signal conditioner 212 provides data format conversion functionality on-board apparatus 100, rather than at controller 208. In an example, pressure-signal conditioner 214 provides data format conversion functionality on-board apparatus 100, rather than at controller 208. Input/output connector 216 provides a convenient and reliable electrical connection between controller 208 and at least one of temperature-signal conditioner 212 and pressure-signal conditioner 214.

Referring generally to FIGS. 1A and 1B and particularly to, e.g., FIGS. 4, 10, and 11, system 128 further comprises pressure source 218, operatively coupled with controller 208. Linear actuator 120 further comprises first actuator pressure input 182, configured to communicate pneumatic pressure from pressure source 218 to move piston 176 to the extended position, and second actuator pressure input 184, configured to communicate pneumatic pressure from pressure source 218 to move piston 176 to the retracted position, which is spaced away from the extended position of piston 176. The preceding subject matter of this paragraph characterizes example 44 of the present disclosure, wherein example 44 also includes the subject matter according to example 42 or 43, above.

Pressure source 218 enables pneumatic control and pneumatic actuation of linear actuator 120. First actuator pressure input 182 and second actuator pressure input 184 enable double-action of linear actuator 120 and delivery of pneumatic pressure to drive linear movement of piston 176 relative to barrel 174.

In some examples, apparatus 100 also includes pressure tubes (not illustrated) to communicate pneumatic pressure to and from linear actuator 120. In an example, the pressure tubes communicate pressure to and from first actuator pressure input 182 and second actuator pressure input 184 to pressurize internal cylinder 276 of barrel 174 of linear actuator 120 and application of pneumatic pressure to piston 176 to control operation of linear actuator 120, such as to move valve 144 relative to valve body 140 to control the flow of extrudable substance 102 from valve body 140 to nozzle 118. In some examples, each one of first actuator pressure input 182 and/or second actuator pressure input 184 is a pneumatic fitting.

Selective pneumatic operation of first actuator pressure input 182 and second actuator pressure input 184 of linear actuator 120 enables precise application of pneumatic pressure to piston 176 to precisely control the flow of extrudable substance 102 out of valve body 140 and into nozzle 118. Additionally, selective pneumatic operation of first actuator pressure input 182 and second actuator pressure input 184 enables the use of automated pneumatic controls to control the pneumatic operation of linear actuator 120.

In some examples, controller 208 includes at least one control valve that is pneumatically coupled to pressure source 218 and linear actuator 120. Controller 208 is configured to control application of pneumatic pressure from pressure source 218 to at least one of first actuator pressure input 182 and second actuator pressure input 184 of linear actuator 120 to drive movement of piston 176. In some examples, the control valve is a two-way valve. In an example, the control valve is an electromechanically operated solenoid valve.

In some examples, pressure source 218 also enables pneumatic control of the delivery mechanism of extrudable substance 102. In an example, the delivery mechanism of extrudable substance 102 includes the pneumatic plunger, operatively coupled with cartridge 116 to urge extrudable substance 102 from cartridge 116 to valve body 140 of valve assembly 112 in response to application of pneumatic pressure. In some examples, controller 208 includes at least one control valve that is pneumatically coupled to pressure source 218 and the delivery mechanism of extrudable substance 102. Controller 208 is configured to control application of pneumatic pressure to urge extrudable substance 102 from cartridge 116 to valve body 140.

Referring generally to FIGS. 1A and 1B and particularly to, e.g., FIGS. 4, 10, and 11, system 128 further comprises first position sensor 186, configured to detect when piston 176 is in the extended position, and second position sensor 188, configured to detect when piston 176 is in the retracted position. System 128 also comprises positioning element 190, coupled to piston 176. Positioning element 190 is configured to actuate first position sensor 186 when piston 176 is in the extended position and is configured to actuate second position sensor 188 when piston 176 is in the retracted position. The preceding subject matter of this paragraph characterizes example 45 of the present disclosure, wherein example 45 also includes the subject matter according to any one of examples 42 to 44, above.

First position sensor 186 and second position sensor 188 enable detection of whether valve 144 is in the open position or the closed position based on the position of piston 176 relative to barrel 174. Positioning element 190 enables actuation of first position sensor 186 when piston 176 is in the extended position to indicate valve 144 is in the open position. Positioning element 190 also enables actuation of second position sensor 188 when piston 176 is in the retracted position to indicate valve 144 is in the closed position.

Referring generally to FIGS. 1A and 1B, positioning element 190 comprises magnet 192. First position sensor 186 comprises first magnetic sensor 194, proximate to one end of barrel 174, and second position sensor 188 comprises second magnetic sensor 196, proximate to the other end of barrel 174. The preceding subject matter of this paragraph characterizes example 46 of the present disclosure, wherein example 46 also includes the subject matter according to example 45, above.

Magnet 192 enables non-contact actuation of first magnetic sensor 194 and second magnetic sensor 196 in response to movement of piston 176 relative to barrel 174 between the extended position and the retracted position of piston 176.

Referring generally to FIGS. 1A and 1B and particularly to, e.g., FIGS. 5, 10, and 11, actuator rod 178 of linear actuator 120 further comprises rod passage 220, extending at least partially through an interior of actuator rod 178. Temperature sensor 204 extends through rod passage 220 into valve chamber 162. The preceding subject matter of this paragraph characterizes example 47 of the present disclosure, wherein example 47 also includes the subject matter according to example 46, above.

Rod passage 220 enables temperature sensor 204 to pass from valve chamber 162, through actuator rod 178, and exit from an end of linear actuator 120, for example, for electrical connection of temperature sensor 204 with controller 208.

In some examples, rod passage 220 generally extends through actuator rod 178 from valve 144 to the end of actuator rod 178, opposite valve 144. In some examples, temperature sensor 204 is coupled to an exterior of actuator rod 178 proximate to valve 144 to be in communication with extrudable substance 102, located within valve chamber 162 of valve body 140. In some examples, temperature sensor 204 includes control lines (e.g., communication cables or wires) that are electrically coupled with controller 208. In some examples, the control lines extend through an opening in actuator rod 178 and pass through rod passage 220 of actuator rod 178. In some examples, the control lines and a portion of temperature sensor 204 are located within rod passage 220 and another portion of temperature sensor 204 exits through the opening, formed in actuator rod 178, to be in communication with extrudable substance 102, located within valve chamber 162. In some examples, rod passage 220 extends through first rod body 270, through coupling 272, and through second rod body 274, including through plug 180. In these examples, easy and simple routing of temperature sensor 204 through actuator rod 178 is possible since actuator rod 178 is a multi-component assembly.

Referring generally to FIGS. 1A and 1B and particularly to, e.g., FIGS. 10 and 11, piston 176 comprises first annular piston portion 198, coupled to actuator rod 178, and second annular piston portion 200, coupled to actuator rod 178 and spaced away from first annular piston portion 198. Magnet 192 is an annular magnet, coupled to actuator rod 178 between first annular piston portion 198 and second annular piston portion 200. The preceding subject matter of this paragraph characterizes example 48 of the present disclosure, wherein example 48 also includes the subject matter according to example 46 or 47, above.

Positioning of first magnetic sensor 194 and second magnetic sensor 196 at any location around an exterior of barrel 174 relative to piston 176 is possible since magnet 192 is an annular. First annular piston portion 198, second annular piston portion 200, and magnet 192 enable actuator rod 178 to extend through piston 176 such that temperature sensor 204 can pass through actuator rod 178 and exit linear actuator 120.

Referring generally to FIGS. 1A and 1B and particularly to, e.g., FIGS. 4, 5, and 8, valve assembly 112 further comprises coupling member 146, coupled to tubular sleeve 108 and rotatable relative to bracket 104 together with tubular sleeve 108. Valve body 140 is coupled to coupling member 146. Linear actuator 120 is coupled to coupling member 146 opposite valve body 140. The preceding subject matter of this paragraph characterizes example 49 of the present disclosure, wherein example 49 also includes the subject matter according to any one of examples 37 to 48, above.

Coupling member 146 enables valve body 140 to be simply, easily, and effectively coupled to and/or decoupled from tubular sleeve 108 within opening 142 such that valve body 140 is co-rotatable with tubular sleeve 108. Coupling member 146 also enables linear actuator 120 to be simply, easily, and effectively coupled to and/or decoupled from valve body 140 with actuator rod 178 extending into valve chamber 162 such that linear actuator 120 can control the position of valve 144 relative to valve body 140. Coupling member 146 also restricts linear movement of valve body 140 along central axis 110 of bracket 104.

Referring generally to FIGS. 1A and 1B and particularly to, e.g., FIGS. 5, 10, and 11, coupling member 146 comprises coupling-member passage 222, coaxially aligned with valve passage 164. The preceding subject matter of this paragraph characterizes example 50 of the present disclosure, wherein example 50 also includes the subject matter according to example 49, above.

Coupling-member passage 222 enables actuator rod 178 to pass through coupling member 146 and into valve body 140 when linear actuator 120 is coupled to coupling member 146. In some examples, coupling-member passage 222 is coaxially aligned with valve passage 164 and opens into valve passage 164 when valve body 140 is coupled to coupling member 146.

Referring generally to FIGS. 1A and 1B and particularly to, e.g., FIG. 4, coupling member 146 comprises first locking interface 252, configured to releasably lock valve body 140 to coupling member 146, and second locking interface 254, configured to releasably lock barrel 174 of linear actuator 120 to coupling member 146. The preceding subject matter of this paragraph characterizes example 51 of the present disclosure, wherein example 51 also includes the subject matter according to example 49 or 50, above.

First locking interface 252 enables valve body 140 to be simply, easily, and effectively coupled to and/or decoupled from coupling member 146. Second locking interface 254 enables linear actuator 120 to be simply, easily, and effectively coupled to and/or decoupled from coupling member 146.

In some examples, valve body 140 also includes third locking interface 278, configured to interlock with first locking interface 252 of coupling member 146. In some examples, first locking interface 252 and third locking interface 278 are cooperating portions of a snap-lock interface. In an example, first locking interface 252 includes at least one tab 280 and third locking interface 278 includes at least one slot 282 that is geometrically complementary to tab 280 and that is configured to receive and retain tab 280 upon insertion of coupling member 146 into valve body 140. In some examples, one or more snap rings (e.g., first snap rings 332) are circumferentially coupled to coupling member 146 and valve body 140 to retain tab 280 and slot 282 in an interlocked position. In some other examples, other types of couplings and/or fasteners are used to couple valve body 140 to coupling member 146.

In some examples, linear actuator 120 also includes fourth locking interface 286, configured to interlock with second locking interface 254 of coupling member 146. In some examples, second locking interface 254 and fourth locking interface 286 are cooperating portions of a twist-lock interface. In an example, fourth locking interface 286 includes at least one twist-lock retainer 288 and second locking interface 254 includes at least one twist-lock clamp 290. In some examples, twist-lock clamp 290 is geometrically (e.g., cross-sectionally) complementary to twist-lock retainer 288 and is configured to receive and retain twist-lock retainer 288 upon insertion of twist-lock retainer 288 into twist-lock clamp 290 and a twisting action of linear actuator 120 relative to coupling member 146. In an example, twist-lock retainer 288 includes a shaft, projecting outward from barrel 174 of linear actuator 120, and a disk-like head, located at an end of the shaft. In an example, twist-lock retainer 288 is a shoulder bolt, coupled to barrel 174 of linear actuator 120. In some other examples, other types of couplings and/or fasteners are used to couple linear actuator 120 to coupling member 146.

Referring generally to FIGS. 1A and 1B and particularly to, e.g., FIGS. 5-7 and 9, system 128 further comprises first drive assembly 150, configured to selectively controllably rotate tubular sleeve 108 about central axis 110 relative to bracket 104. The preceding subject matter of this paragraph characterizes example 52 of the present disclosure, wherein example 52 also includes the subject matter according to any one of examples 33 to 51, above.

First drive assembly 150 enables automated, precise rotation of tubular sleeve 108 about central axis 110 relative to bracket 104. Controlled, selective rotary motion of tubular sleeve 108 relative to bracket 104 selectively adjusts rotational orientation of tubular sleeve 108 about central axis 110 relative to bracket 104 and selectively adjusts angular orientation of nozzle 118 relative to bracket 104 and relative to surface 126. Selective adjustability of the angular orientation of nozzle 118 relative to bracket 104 positions nozzle outlet 134 in any one of numerous positions about central axis 110 relative to bracket 104 and surface 126. Angular adjustment of nozzle 118 relative to surface 126 enables deposition of extrudable substance 102 onto various areas of surface 126 without having to change the position of apparatus 100, for example, via robot 106.

Referring generally to FIGS. 1A and 1B and particularly to, e.g., FIGS. 5-7 and 9, first drive assembly 150 comprises first motor 152 and first power-transmitting component 154, operatively coupled with first motor 152 and tubular sleeve 108. The preceding subject matter of this paragraph characterizes example 53 of the present disclosure, wherein example 53 also includes the subject matter according to example 52, above.

First motor 526 is capable of controllably selectively rotating tubular sleeve 108 about central axis 110 relative to bracket 104 since first motor 152 is operatively coupled with first power-transmitting component 154 and tubular sleeve 108 is operatively coupleable with first power-transmitting component 154. Controlled selective rotation of first power-transmitting component 154 by first motor 152 enables tracking of the rotational position of tubular sleeve 108 relative to bracket 104 and, thus, tracking of the angular orientation of nozzle 118.

In some examples, first motor 152 includes an output shaft that is rotatable by first motor 152 to produce a rotary force or torque when first motor 152 is operated. In some examples, first motor 152 is any one of various rotational motors, such as an electric motor, a hydraulic motor, a pneumatic motor, an electromagnetic motor, and the like.

First power-transmitting component 154 provides an efficient and reliable mechanism to transmit power from first motor 152 to tubular sleeve 108, such as when central axis 110 is not co-axial with second axis 292 (e.g., an axis of rotation of first motor 152). In an example, first power-transmitting component 154 is a belt, operatively coupled with the output shaft of first motor 152. In other examples, first power-transmitting component 154 is any one of a chain, a gear, a gear train, and the like. Advantageously, the belt is lighter and cleaner than other implementations of first power-transmitting component 154; for example, the belt does not require lubrication for effective operation. In some example, bracket 104 includes a bracket wall, at least partially circumferentially surrounding tubular sleeve 108. In some examples, bracket 104 also includes a bracket opening, defined through the bracket wall. In some examples, the bracket opening provides access to tubular sleeve 108 for first power-transmitting component 154, which passes through the bracket opening.

In some examples, first drive assembly 150 also includes one or more other transmission components, configured to operatively couple first motor 152 with first power-transmitting component 154, including, but not limited to, gears, belts, sprockets, and the like.

Referring generally to FIGS. 1A and 1B and particularly to, e.g., FIGS. 5-7 and 9, tubular sleeve 108 further comprises splines 158, projecting outwardly from tubular sleeve 108. First power-transmitting component 154 comprises teeth 156, configured to mate with splines 158 of tubular sleeve 108. The preceding subject matter of this paragraph characterizes example 54 of the present disclosure, wherein example 54 also includes the subject matter according to example 53, above.

Teeth 156 of first power-transmitting component 154 and splines 158 of tubular sleeve 108 enable mating engagement of and an interference fit between first power-transmitting component 154 and tubular sleeve 108. Mating engagement of teeth 156 of first power-transmitting component 154 with splines 158 of tubular sleeve 108 enables co-rotation of first power-transmitting component 154 and tubular sleeve 108.

In some examples, splines 158 of tubular sleeve 108 project radially outwardly from and are located circumferentially around an exterior of tubular sleeve 108. In an example, with tubular sleeve 108 coupled to bracket 104, splines 158 are oriented parallel with central axis 110. In an example, splines 158 extend from proximate to one end of tubular sleeve 108 to proximate to the other end of tubular sleeve 108. In another example, splines 158 extend between annular bearings 256, coupled to tubular sleeve 108. In another example, splines 158 are located on only a circumferential portion of tubular sleeve 108 that is engaged by first power-transmitting component 154. Throughout the present disclosure, the term parallel refers to an orientation between items extending in approximately the same direction.

Referring generally to FIGS. 1A and 1B and particularly to, e.g., FIGS. 5-7 and 9, bracket 104 comprises tensioner 160, configured to tension first power-transmitting component 154 with respect to first motor 152 and tubular sleeve 108. The preceding subject matter of this paragraph characterizes example 55 of the present disclosure, wherein example 55 also includes the subject matter according to example 53 or 54, above.

Tensioner 160 applies adjustable tension to first power-transmitting component 154. With tensioner 160 engaged with and applying tension to first power-transmitting component 154, first power-transmitting component 154 maintains contact with a portion of tubular sleeve 108 so that teeth 156 of first power-transmitting component 154 remain mated with splines 158 of tubular sleeve 108.

In some examples, tensioner 160 includes a tensioner base, coupled to bracket 104, and a tensioner pulley, coupled to the tensioner base and rotatable relative to the tensioner base about an axis, parallel to central axis 110. In these examples, the tensioner pulley is configured to engage first power-transmitting component 154. In some examples, tensioner 160 is linearly moveable relative to bracket 104. Linear movement of tensioner 160 enables positional adjustment of tensioner 160 relative to bracket 104 and adjustment of tension, applied to first power-transmitting component 154 by tensioner 160. In some examples, tensioner 160 also includes a tensioner-biasing element, configured to bias the tensioner pulley against first power-transmitting component 154. In some examples, tensioner 160 is not rotatable relative to bracket 104. Fixing rotational orientation of tensioner 160 relative to bracket 104 fixes the position of the tensioner pulley parallel to central axis 110 and enables tensioner 160 to maintain positive contact with first power-transmitting component 154.

Referring generally to FIGS. 1A and 1B and particularly to, e.g., FIGS. 4, 8, and 9, tubular sleeve 108 further comprises first interlock 224. Valve body 140 comprises second interlock 226, geometrically complementary with first interlock 224. First interlock 224 is configured to engage second interlock 226 to prevent rotation of valve body 140 about central axis 110 relative to tubular sleeve 108. The preceding subject matter of this paragraph characterizes example 56 of the present disclosure, wherein example 56 also includes the subject matter according to any one of examples 52 to 55, above.

Mating engagement of first interlock 224 and second interlock 226 fixes rotational orientation of valve body 140 relative to tubular sleeve 108 and prevents rotation of valve body 140 about central axis 110 relative to tubular sleeve 108.

In some examples, first interlock 224 of tubular sleeve 108 includes groove 294 and second interlock 226 of valve body 140 includes protrusion 298. Alignment and engage of protrusion 298 with groove 294 fixes the rotational orientation of valve body 140 relative to tubular sleeve 108. In some examples, groove 294 of first interlock 224 is located on and depends inwardly from peripheral wall 296 of tubular sleeve 108 (FIG. 9). In some examples, protrusion 298 of second interlock 226 of valve body 140 is located on and projects outwardly from an exterior surface of valve body 140 (FIG. 4). In some examples, groove 294 extends from one edge of peripheral wall 296 toward the other edge of peripheral wall 296. Protrusion 298 is slidingly received by groove 294 when valve body 140 is positioned (e.g., inserted) within opening 142 and circumferentially surrounded by peripheral wall 296 of tubular sleeve 108. In an example, groove 294 includes open end 300 located at the one edge of peripheral wall 296 and closed end 302, opposite open end 300. Open end 300 enables insertion of protrusion 298 within groove 294. Closed end 302 limits linear movement of valve body 140 relative to tubular sleeve 108 when protrusion 298 is completely received by groove 294, for example, when an end of protrusion 298 contacts closed end 302 of groove 294. While not explicitly illustrated, in some other examples, first interlock 224 of tubular sleeve 108 includes protrusion 298, located on and projecting outwardly from peripheral wall 296 of tubular sleeve 108, and second interlock 226 of valve body 140 includes groove 294, located on and depending inwardly from exterior surface of valve body 140. In some examples, first interlock 224 of tubular sleeve 108 includes more than one groove 294 and second interlock 226 of valve body 140 includes more than one protrusion 298.

Referring generally to FIGS. 1A and 1B and particularly to, e.g., FIG. 2, bracket 104 is configured to be removably coupled to robot 106 so that housing is linearly moveable along central axis 110 relative to robot 106. The preceding subject matter of this paragraph characterizes example 57 of the present disclosure, wherein example 57 also includes the subject matter according to any one of examples 52 to 56, above.

Linear movement of bracket 104 relative to robot 106 enables linear movement of nozzle 118 relative to robot 106 and to surface 126. Linear movement of nozzle 118 relative to surface 126 enables nozzle 118 to dispense extrudable substance 102 on surface 126 that has an irregular shape or on multiple other surfaces of the workpiece, for example, without having to change the position of apparatus 100 via robot 106.

Referring generally to FIGS. 1A and 1B and particularly to, e.g., FIGS. 2-7, system 128 further comprises robot interface 228, configured to be coupled to robot 106, and interface bracket 230, configured to be coupled to robot interface 228 and to be linearly moveable relative to robot interface 228. Bracket 104 is coupled to interface bracket 230. The preceding subject matter of this paragraph characterizes example 58 of the present disclosure, wherein example 58 also includes the subject matter according to example 57, above.

Linear movement of interface bracket 230 relative to robot interface 228 enables linear movement of bracket 104 relative to robot 106. Robot interface 228 enables quick coupling of apparatus 100 with robot 106 and quick releasing of apparatus 100 from robot 106. Interface bracket 230 movably couples bracket 104 to robot interface 228.

In some examples, robot interface 228 provides quick coupling of communication lines between apparatus 100 and robot 106. In some examples, robot interface 228 enables automated coupling of apparatus 100 with robot 106 and automated releasing of apparatus 100 from robot 106. In some examples, robot interface 228 is a tool-side portion of a pneumatic quick-change mechanism and robot 106 includes a tool interface of the pneumatic quick-change mechanism.

In some examples, interface bracket 230 includes a pair of bracket arms 304. Bracket arms 304 of interface bracket 230 engage robot interface 228 to couple interface bracket 230 with robot interface 228 and to guide linear motion of interface bracket 230 relative to robot interface 228. In some examples, each one of bracket arms 304 includes a guide channel and robot interface 228 includes a pair of guide rails. Each guide channels of bracket arms 304 is configured to receive and move along an associated one of the guide rails.

Referring generally to FIGS. 1A and 1B and particularly to, e.g., FIG. 5, system 128 further comprises proximity sensor 232, coupled to interface bracket 230 and configured to detect when tubular sleeve 108 is in a predetermined rotational orientation relative to bracket 104. System 128 also comprises homing element 234, coupled to tubular sleeve 108 and configured to actuate proximity sensor 232 when tubular sleeve 108 is rotated about central axis 110 to the predetermined rotational orientation. The preceding subject matter of this paragraph characterizes example 59 of the present disclosure, wherein example 59 also includes the subject matter according to example 58, above.

Homing element 234 enables actuation of proximity sensor 232 when tubular sleeve 108 is rotated to a predetermined rotational orientation relative to bracket 104, for example, to indicate that tubular sleeve 108 is in a home position. Use of homing element 234 and proximity sensor 232 to indicate the home position also enables use of an incremental position encoder, which is capable of determining the rotational orientation of tubular sleeve 108 relative to bracket 104 following a power interruption, rather than an absolute position encoder, which would be unable to determine the rotational orientation of tubular sleeve 108 relative to bracket 104 in case of a power interruption.

Referring generally to FIGS. 1A and 1B, homing element 234 comprises magnet 236, coupled to tubular sleeve 108. Proximity sensor 232 is magnetic sensor. The preceding subject matter of this paragraph characterizes example 60 of the present disclosure, wherein example 60 also includes the subject matter according to example 59, above.

Magnet 236 enables non-contact actuation of magnetic sensor 238 when tubular sleeve 108 is rotated to the predetermined rotational orientation relative to bracket 104 to indicate that tubular sleeve 108 is in the home position.

Referring generally to FIGS. 1A and 1B and particularly to, e.g., FIGS. 2-7, interface bracket 230 is selectively linearly movable along central axis 110 relative to robot interface 228. The preceding subject matter of this paragraph characterizes example 61 of the present disclosure, wherein example 61 also includes the subject matter according to any one of examples 58 to 60, above.

Selective linear movement of interface bracket 230 along central axis 110 relative to robot interface 228 enables controlled, selective adjustment of the linear position of bracket 104 relative to robot 106 and controlled, selective adjustment of the linear position of nozzle 118 relative to surface 126. Controlled, selective linear movement of nozzle 118 relative to surface 126 enables nozzle 118 to deposit extrudable substance 102 on surface 126 that has an irregular shape or on multiple other surfaces of the workpiece.

In some examples, apparatus 100 also includes a second drive assembly, configured to selectively controllably translate interface bracket 230 along central axis 110 relative to robot interface 228. The second drive assembly enables automated, precise linear translation of interface bracket 230 along central axis 110 relative to robot interface 228. Controlled selective linear movement of interface bracket 230 relative to robot interface 228 controls selective adjustment of linear position of bracket 104 along central axis 110 relative to robot interface 228 and controlled selective adjustment of linear position of nozzle 118 relative to surface 126. In some examples, the second drive assembly includes a second motor and a second power-transmitting component, operatively coupled with the second motor and interface bracket 230. The second motor is able to controllably translate interface bracket 230 relative to robot interface 228 since the second motor is operatively coupled with the second power-transmitting component and interface bracket 230 is operatively coupled with the second power-transmitting component. The second power-transmitting component enables selective linear movement of interface bracket 230 along an axis parallel to central axis 110 relative to robot interface 228. With the second power-transmitting component operatively coupled with interface bracket 230, operation of the second power-transmitting component enables selective linear movement of interface bracket 230 relative to robot interface 228. Additionally, controlled selective translation of interface bracket 230 relative to robot interface 228 enables automated linear tracking of interface bracket 230 relative to robot interface 228.

In some examples, the second motor includes an output shaft that is rotatable by the second motor to produce a rotary force or torque when the second motor is operated. In some examples, the second motor is any one of various rotational motors, such as an electric motor, a hydraulic motor, a pneumatic motor, an electromagnetic motor, and the like. In some examples, the second motor is coupled to robot interface 228. The second power-transmitting component provides an efficient and reliable mechanism to transmit power from the second motor to interface bracket 230. In some examples, the second power-transmitting component is any one of a translation screw drive, a chain, a belt, a gear, a gear train, and the like. In some examples, the second drive assembly also includes one or more other transmission components, configured to operatively couple the second motor with second power-transmitting component, including, but not limited to, gears, belts, sprockets, and the like.

Referring generally to FIGS. 1A, 1B, and 1-3 and particularly to, e.g., FIG. 16, method 1000 of depositing extrudable substance 102 onto surface 126 is disclosed. Method 1000 comprises (block 1002) delivering extrudable substance 102 from cartridge 116 to flow-bypass assembly 114, (block 1004) selectively controlling flow-bypass assembly 114 to purge air from extrudable substance 102 before extrudable substance 102 enters delivery tube 130, (block 1006) selectively controlling flow-bypass assembly 114 to deliver extrudable substance 102 from flow-bypass assembly 114 to valve assembly 112 via delivery tube 130, and (block 1008) controlling flow of extrudable substance 102 from valve assembly 112 to nozzle 118. The preceding subject matter of this paragraph characterizes example 62 of the present disclosure.

Method 1000 provides for depositing extrudable substance 102, from cartridge 116, through nozzle 118, onto surface 126 of a workpiece, for example, located in confined space. Purging air from extrudable substance 102 using flow-bypass assembly 114 before delivering extrudable substance 102 to delivery tube 130 prevents air from becoming entrapped within delivery tube 130. Preventing air from becoming entrapped within delivery tube 130 eliminates waste of extrudable substance 102 that is located within delivery tube 130 resulting from passing air from cartridge 116 through delivery tube 130 and out off valve assembly 112, which would otherwise be required to purge air entrapped within delivery tube 130, for example, during replacement of cartridge 116 and/or a purging operation.

Referring generally to FIGS. 1A, 1B, 2, 3, and 12-15 and particularly to, e.g., FIG. 16, according to method 1000, (block 1004) selectively controlling flow-bypass assembly 114 to purge air from extrudable substance 102 before extrudable substance 102 enters delivery tube 130 comprises (block 1010) actuating ball valve 246 to position ball valve 246 at a selected first rotational orientation to communicatively couple flow-bypass purging port 244 of flow-bypass assembly 114 with flow-bypass inlet port 240 of flow-bypass assembly 114, communicatively coupled with cartridge 116.

The preceding subject matter of this paragraph characterizes example 63 of the present disclosure, wherein example 63 also includes the subject matter according to example 62, above.

Selective, communicative coupling of flow-bypass inlet port 240 with flow-bypass purging port 244 via rotation of ball valve 246 enables air to be purged from the flow of extrudable substance 102 before extrudable substance 102 enters delivery tube 130.

Referring generally to FIGS. 1A, 1B, 2, 3, and 12-15 and particularly to, e.g., FIG. 16, according to method 1000, (block 1006) selectively controlling flow-bypass assembly 114 to deliver extrudable substance 102 from flow-bypass assembly 114 to valve assembly 112 via delivery tube 130 comprises (block 1012) actuating ball valve 246 to position ball valve 246 at a selected second rotational orientation to communicatively couple flow-bypass dispensing port 242 of flow-bypass assembly 114 with flow-bypass inlet port 240 of flow-bypass assembly 114. The preceding subject matter of this paragraph characterizes example 64 of the present disclosure, wherein example 64 also includes the subject matter according to example 63, above.

Selective, communicative coupling of flow-bypass inlet port 240 with flow-bypass dispensing port 242 via rotation of ball valve 246 enables extrudable substance 102 to flow from cartridge 116 to valve assembly 112 via delivery tube 130.

Referring generally to FIGS. 1A, 1B, 4, 5, 10, and 11 and particularly to, e.g., FIG. 16, according to method 1000, (block 1008) controlling flow of extrudable substance 102 from valve assembly 112 to nozzle 118 comprises (block 1014) actuating linear actuator 120 of valve assembly 112, coupled to valve body 140 of valve assembly 112, to move valve 144 of valve assembly 112 into one of an open position, in which valve 144 does not sealingly engage valve seat 172 of valve body 140, or a closed position, in which valve 144 sealingly engages valve seat 172. The preceding subject matter of this paragraph characterizes example 65 of the present disclosure, wherein example 65 also includes the subject matter according to any one of examples 62 to 64, above.

Actuation of linear actuator 120 enables precise control of the flow of extrudable substance 102 from valve body 140 through nozzle 118. In an example, controller 208 is operatively coupled to linear actuator 120 to control the position of valve 144 relative to valve body 140, which controls the flow rate of extrudable substance 102 through valve body 140 by one of sealingly engaging valve seat 172 of valve body 140 or not sealingly engage valve seat 172 of valve body 140.

Referring generally to FIGS. 1A, 1B, 4, 5, 10, and 11 and particularly to, e.g., FIG. 16, method 1000 further comprises (block 1016) detecting when piston 176 of linear actuator 120 is in an extended position to indicate that valve 144 is in the open position and (block 1018) detecting when piston 176 of linear actuator 120 is in a retracted position to indicate that valve 144 is in the closed position. The preceding subject matter of this paragraph characterizes example 66 of the present disclosure, wherein example 66 also includes the subject matter according to example 65, above.

Detecting when piston 176 is in the extended position or in the retracted position enables precise control of flow of extrudable substance 102 from valve body 140 through nozzle 118 by controlling the position of valve 144, relative to valve body 140 and valve seat 172, between the open and the closed positions. Moving valve 144 to the open position, in which valve 144 does not sealingly engage valve seat 172, enables flow of extrudable substance 102 out of valve outlet port 168 and into nozzle 118. Moving valve 144 into the closed position, in which valve 144 sealingly engages valve seat 172, prevents flow of extrudable substance 102 out of valve outlet port 168 and into nozzle 118.

Referring generally to FIGS. 1A, 1B, 4, 5, 10, and 11 and particularly to, e.g., FIG. 16, according to method 1000, (block 1020) when valve 144 is moved from the open position to the closed position, extrudable substance 102 is drawn back into valve chamber 162 of valve body 140. The preceding subject matter of this paragraph characterizes example 67 of the present disclosure, wherein example 67 also includes the subject matter according to example 65 or 66, above.

Movement of valve 144 from the open position to the closed position pulls extrudable substance 102 back into valve body 140 to prevent excess amounts of extrudable substance 102 from passing through valve outlet port 168 and into nozzle 118 during linear movement of valve 144 relative to valve body 140.

Referring generally to FIGS. 1A, 1B, and 3-6 and particularly to, e.g., FIG. 16, method 1000 further comprises, (block 1022) with valve assembly 112 fixed to tubular sleeve 108 and tubular sleeve 108 coupled to bracket 104 via opening 142 that has central axis 110, selectively rotating tubular sleeve 108 relative to bracket 104 about central axis 110 to controllably position nozzle 118 relative to surface 126. The preceding subject matter of this paragraph characterizes example 68 of the present disclosure, wherein example 68 also includes the subject matter according to any one of examples 62 to 67, above.

Selectively rotating tubular sleeve 108 relative to bracket 104 enables positioning of nozzle 118 relative to surface 126 for dispensing extrudable substance 102.

Referring generally to FIGS. 1A, 1B, 5, and 6 and particularly to, e.g., FIG. 16, method 1000 further comprises (block 1024) detecting when tubular sleeve 108 is in a predetermined rotational orientation relative to bracket 104 by actuating proximity sensor 232, located proximate to tubular sleeve 108, with homing element 234, located on tubular sleeve 108. The preceding subject matter of this paragraph characterizes example 69 of the present disclosure, wherein example 69 also includes the subject matter according to example 68, above.

Detecting the rotational orientation of tubular sleeve 108 relative to bracket 104 enables actuation of proximity sensor 232 when tubular sleeve 108 is rotated to the predetermined rotational orientation relative to bracket 104 to indicate tubular sleeve 108 is in the home position. Detecting the rotational orientation of tubular sleeve 108 also enables use of an incremental, rather than an absolute, position encoder, which would be unable to determine the rotational orientation of tubular sleeve 108 relative to bracket 104 in the case of a power interruption.

Referring generally to FIGS. 1A, 1B, 2, and 6 and particularly to, e.g., FIG. 16, method 1000 further comprises, (block 1026) with bracket 104 coupled to robot interface 228 that is coupled to robot 106, selectively linearly moving bracket 104 relative to robot interface 228 along central axis 110. The preceding subject matter of this paragraph characterizes example 70 of the present disclosure, wherein example 70 also includes the subject matter according to example 68 or 69, above.

Linearly movement of bracket 104 relative to robot interface 228 enables linear movement of bracket 104 relative to robot 106 and linear movement of nozzle 118 relative to surface 126.

Referring generally to FIGS. 1A and 1B and particularly to, e.g., FIG. 16, method 1000 further comprises, (block 1028) with flow-bypass assembly 114 selectively controlled to deliver extrudable substance 102 from flow-bypass assembly 114 to valve assembly 112 via delivery tube 130, controlling flow rate of extrudable substance 102 through valve body 140 of valve assembly 112, communicatively coupled with delivery tube 130. The preceding subject matter of this paragraph characterizes example 71 of the present disclosure, wherein example 71 also includes the subject matter according to any one of examples 62 to 70, above.

Control of the flow rate of extrudable substance 102 through valve body 140 provides control of a rate at which extrudable substance 102 is dispensed from nozzle 118 onto surface 126 and/or an amount of extrudable substance 102, dispensed from nozzle 118 onto surface 126. In some examples, the flow rate of extrudable substance 102 through valve body 140 is controlled by controlling flow of extrudable substance 102 out of cartridge 116 and through delivery tube 130 to deliver extrudable substance 102 to valve body 140. In an example, pressure is applied to extrudable substance 102, located within cartridge 116, to urge extrudable substance 102 out of the outlet port of cartridge 116, through flow-bypass assembly 114, and into delivery tube 130. In some examples, the flow rate of extrudable substance 102 through valve body 140 is controlled by actuating linear actuator 120 to position valve 144 relative to valve body 140 and control flow of extrudable substance 102 from valve outlet port 168 of valve body 140.

Referring generally to FIGS. 1A and 1B and particularly to, e.g., FIG. 16, according to method 1000, controlling the flow rate of extrudable substance 102 through valve body 140 is based, at least in part, on at least one of temperature or pressure of extrudable substance 102, located within valve body 140. The preceding subject matter of this paragraph characterizes example 72 of the present disclosure, wherein example 72 also includes the subject matter according to example 71, above.

Controlling the flow rate of extrudable substance 102 based on at least one of temperature or pressure of extrudable substance 102 enables precise and predictable flow of extrudable substance 102. Monitoring parameters of extrudable substance 102, such as at least one of temperature or pressure of extrudable substance 102 located within valve chamber 162 of valve body 140, as extrudable substance 102 flows through valve body 140 and out from nozzle 118, enables a consistent and/or desired amount of extrudable substance 102 to be deposited or applied onto surface 126. In an example, controller 208 is operatively coupled to at least one of pressure sensor 206 and/or temperature sensor 204 to process at least one of pressure values and/or temperature values of extrudable substance 102 within valve body 140.

In some examples, at least one of the temperature and/or the pressure of extrudable substance 102, flowing through valve body 140 is determined and, based on at least one of the temperature and/or the pressure of extrudable substance 102, extrudable substance 102 is delivered to valve body 140 through flow-bypass assembly 114 and delivery tube 130 and/or linear actuator 120 positions valve 144 in one of the open position or the closed position relative to valve body 140 and valve seat 172.

In some examples, controller 208 controls the pressure or the force applied to extrudable substance 102 located within cartridge 116 based on the processed pressure and/or temperature values to control the flow rate of extrudable substance 102 from cartridge 116 into delivery tube 130 and ultimately through valve body 140. In some examples, controller 208 provides positional control of valve 144 relative to valve body 140 based on the processed pressure and/or temperature values to control the flow rate of extrudable substance 102 through valve body 140.

Examples of the present disclosure may be described in the context of aircraft manufacturing and service method 1100 as shown in FIG. 17 and aircraft 1102 as shown in FIG. 18. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for depositing an extrudable substance onto a surface, the apparatus comprising:
   a bracket, comprising an opening that has a central axis;
   a tubular sleeve, coupled to the bracket via the opening and rotatable relative to the bracket about the central axis;
   a valve assembly, comprising:
      a valve body, fixed to the tubular sleeve and rotatable relative to the bracket together with the tubular sleeve, the valve body comprising:
         a valve chamber;
         a valve inlet port, communicatively coupled with the valve chamber;
         a valve outlet port, coaxial with the valve chamber and communicatively coupled with the valve chamber;
         a valve seat, located between the valve chamber and the valve outlet port; and
         a valve passage, coaxial with the valve chamber and located opposite the valve outlet port;
      a linear actuator, comprising:
         a barrel, removably coupled with the valve body;
         a piston, movable along the central axis within the barrel between an extended position and a retracted position;
         an actuator rod, coupled to the piston and extending through the valve passage into the valve chamber; and
         a rod passage, extending at least partially through an interior of the actuator rod;
      a valve, internal to the valve body and coupled to the actuator rod such that the linear actuator is configured to position the valve relative to the valve body;
   a temperature sensor, extending through the rod passage into the valve chamber and configured to be in communication with the extrudable substance within the valve chamber of the valve body when the extrudable substance is introduced within the valve chamber; and
   a nozzle, fixed to the valve body and rotatable relative to the bracket together with the valve body, wherein:
   with the piston in the extended position, at least a portion of the valve extends beyond the valve outlet port, in a direction toward the nozzle, and does not sealingly engage the valve seat; and
   with the piston in the retracted position, the valve is located within the valve outlet port and sealingly engages the valve seat.

2. The apparatus according to claim 1, wherein:
   the valve inlet port is configured to be communicatively coupled with a cartridge, configured to contain the extrudable substance;
   the valve outlet port is configured to be communicatively coupled to the nozzle; and
   the valve passage is communicatively coupled with the valve chamber.

3. The apparatus according to claim 1, further comprising a pressure sensor, configured to be in communication with the extrudable substance within the valve chamber of the valve body when the extrudable substance is introduced within the valve chamber.

4. The apparatus according to claim 3, further comprising a pressure-sensor housing configured to house the pressure sensor, and wherein the pressure-sensor housing is configured to be removably coupled to the valve body to communicatively couple the pressure sensor with the extrudable substance within the valve chamber of the valve body.

5. The apparatus according to claim 3, further comprising a controller, operatively coupled with at least one of the temperature sensor or the pressure sensor to control, based on signals, obtained from at least the one of the temperature sensor or the pressure sensor, flow rate of the extrudable substance through the valve body.

6. The apparatus according to claim 5, further comprising:
   a temperature-signal conditioner, electrically coupled to the temperature sensor;
   a pressure-signal conditioner, electrically coupled to the pressure sensor; and
   an input/output connector, communicatively coupling at least one of the temperature-signal conditioner or the pressure-signal conditioner with the controller.

7. The apparatus according to claim 5, further comprising a pressure source, operatively coupled with the controller, and wherein the linear actuator further comprises:
   a first actuator pressure input, configured to communicate pneumatic pressure from the pressure source to the linear actuator to move the piston to the extended position; and
   a second actuator pressure input, configured to communicate pneumatic pressure from the pressure source to the linear actuator to move the piston to the retracted position, which is spaced away from the extended position of the piston.

8. The apparatus according to claim 5, further comprising:
   a first position sensor, configured to detect when the piston is in the extended position;
   a second position sensor, configured to detect when the piston is in the retracted position; and
   a positioning element, coupled to the piston, and
wherein the positioning element is configured to actuate the first position sensor when the piston is in the extended position and is configured to actuate the second position sensor when the piston is in the retracted position.

9. The apparatus according to claim 8, wherein:
   the positioning element comprises a magnet;
   the first position sensor comprises a first magnetic sensor, proximate one end of the barrel; and the second position sensor comprises a second magnetic sensor, proximate the other end of the barrel.

10. The apparatus according to claim 9, wherein:
the piston comprises:
a first annular piston portion, coupled to the actuator rod; and
a second annular piston portion, coupled to the actuator rod and spaced away from the first annular piston portion; and
the magnet is an annular magnet, coupled to the actuator rod between the first annular piston portion and the second annular piston portion.

11. The apparatus according to claim 1, wherein the nozzle comprises:
a nozzle inlet, communicatively coupled with the valve body; and
a nozzle outlet, laterally offset from the nozzle inlet relative to the central axis.

12. The apparatus according to claim 1, wherein the actuator rod comprises a plug, positioned within the valve passage.

13. The apparatus according to claim 1, wherein:
the valve assembly further comprises a coupling member, coupled to the tubular sleeve and rotatable relative to the bracket together with the tubular sleeve;
the valve body is coupled to the coupling member; and
the linear actuator is coupled to the coupling member opposite the valve body.

14. The apparatus according to claim 13, wherein the coupling member comprises a coupling-member passage, coaxially aligned with valve passage.

15. The apparatus according to claim 13, wherein the coupling member comprises:
a first locking interface, configured to releasably lock the valve body to the coupling member; and
a second locking interface, configured to releasably lock the barrel of the linear actuator to the coupling member.

16. The apparatus according to claim 1, further comprising a first drive assembly, configured to selectively controllably rotate the tubular sleeve about the central axis relative to the bracket.

17. The apparatus according to claim 16, wherein the first drive assembly comprises:
a first motor; and
a first power-transmitting component, operatively coupled with the first motor and with the tubular sleeve.

18. An apparatus for depositing an extrudable substance onto a surface, the apparatus comprising:
a bracket, comprising an opening that has a central axis;
a tubular sleeve, coupled to the bracket via the opening and rotatable relative to the bracket about the central axis;
a valve assembly, comprising:
a valve body, fixed to the tubular sleeve and rotatable relative to the bracket together with the tubular sleeve, the valve body comprising a valve chamber;
a linear actuator, comprising an actuator rod that extends into the valve chamber and comprises a rod passage, extending at least partially though an interior of the actuator rod; and
a valve, internal to the valve body and coupled to the actuator rod such that the linear actuator is configured to position the valve relative to the valve body;
a temperature sensor, extending through the rod passage into the valve chamber and configured to be in communication with the extrudable substance within the valve chamber of the valve body when the extrudable substance is introduced within the valve chamber; and
a nozzle, fixed to the valve body and rotatable relative to the bracket together with the valve body.

19. The apparatus according to claim 18, further comprising a controller, operatively coupled with the temperature sensor to control, based at least in part on signals, obtained from the temperature sensor, flow rate of the extrudable substance through the valve body.

20. The apparatus according to claim 18, further comprising a first drive assembly, configured to selectively controllably rotate the tubular sleeve about the central axis relative to the bracket.

* * * * *